US011462050B2

(12) United States Patent
Potash et al.

(10) Patent No.: US 11,462,050 B2
(45) Date of Patent: Oct. 4, 2022

(54) SYSTEMS AND METHODS OF LIVENESS DETERMINATION

(71) Applicant: Certify Global Inc., Rockville, MD (US)

(72) Inventors: Marc Potash, Rockville, MD (US); Preetham Gowda, Germantown, MD (US)

(73) Assignee: Certify Global Inc., Rockville, MD (US)

( * ) Notice: Subject to any disclaimer, the term of this patent is extended or adjusted under 35 U.S.C. 154(b) by 321 days.

(21) Appl. No.: 16/721,602

(22) Filed: Dec. 19, 2019

(65) Prior Publication Data

US 2021/0192173 A1   Jun. 24, 2021

(51) Int. Cl.
*G06K 9/00* (2022.01)
*G06V 40/12* (2022.01)
*H04L 9/40* (2022.01)

(52) U.S. Cl.
CPC ...... *G06V 40/1394* (2022.01); *H04L 63/0861* (2013.01)

(58) Field of Classification Search
None
See application file for complete search history.

(56) References Cited

U.S. PATENT DOCUMENTS

| 7,245,218 | B2 | 7/2007 | Ikehara et al. |
| 8,508,338 | B1 | 8/2013 | Fiddy |
| 8,542,879 | B1 * | 9/2013 | Nechyba ............ G06K 9/00228 382/103 |
| 9,898,646 | B2 * | 2/2018 | Besson ................ G06K 9/0012 |
| 10,354,158 | B2 * | 7/2019 | Zhou .................. G06K 9/00912 |
| 10,372,966 | B2 * | 8/2019 | Suwald .............. G06K 9/00087 |
| 10,469,486 | B2 * | 11/2019 | Baras .................... H04L 9/3231 |

(Continued)

FOREIGN PATENT DOCUMENTS

WO   2016/076912 A1   5/2016

OTHER PUBLICATIONS

Foudil Belhaj, "Biometric system for identification and authentication", Doctoral dissertation, HAL Open Science, Ministry of Higher Education and Scientific Research. (Year: 2017).*

*Primary Examiner* — Piotr Poltorak
(74) *Attorney, Agent, or Firm* — The Marbury Law Group, PLLC

(57) ABSTRACT

Embodiments include systems and methods of determining liveness of a biometric feature. A processor of a computing device may receive two or more scans of a biometric feature from a sensor of a source device. The processor may determine surface area rates of change of a surface area of the biometric feature, location stability rates of changes for one or more locations of the biometric feature, and presence information rates of change of the biometric feature. The processor may generate a liveness score based on the determined location stability rates of change, the surface area rates of change, and the presence information rates of change of the biometric feature. The processor may determine whether the generated liveness score meets a liveness threshold. The processor may determine that the biometric feature is a live biometric feature in response to determining that the generated liveness score meets the liveness threshold.

18 Claims, 15 Drawing Sheets

(56) References Cited

U.S. PATENT DOCUMENTS

| | | | |
|---|---|---|---|
| 2003/0163710 A1* | 8/2003 | Ortiz | H04L 63/0861 |
| | | | 713/186 |
| 2007/0014443 A1 | 1/2007 | Russo | |
| 2011/0010558 A1* | 1/2011 | Baldan | G06F 21/32 |
| | | | 713/186 |
| 2013/0044920 A1* | 2/2013 | Langley | G06K 9/4661 |
| | | | 382/115 |
| 2015/0095987 A1* | 4/2015 | Potash | H04L 63/08 |
| | | | 726/4 |
| 2015/0161461 A1* | 6/2015 | McNulty | G06K 9/00073 |
| | | | 382/116 |
| 2016/0019420 A1* | 1/2016 | Feng | G06K 9/00906 |
| | | | 382/117 |
| 2017/0213022 A1* | 7/2017 | Potash | G06F 21/10 |
| 2018/0046852 A1* | 2/2018 | Ionita | G06K 9/00255 |
| 2018/0046853 A1* | 2/2018 | Ionita | G06K 9/6201 |
| 2018/0165508 A1* | 6/2018 | Othman | G06K 9/42 |
| 2018/0181737 A1* | 6/2018 | Tussy | G06K 9/00268 |
| 2018/0232511 A1* | 8/2018 | Bakish | G10L 21/0324 |
| 2018/0276489 A1* | 9/2018 | Xu | G06K 9/00288 |
| 2019/0188510 A1* | 6/2019 | Han | G06K 9/00288 |
| 2019/0251380 A1* | 8/2019 | Park | G06K 9/0061 |
| 2020/0042685 A1* | 2/2020 | Tussy | G06K 9/00892 |
| 2021/0109917 A1* | 4/2021 | Xiao | G06F 16/245 |
| 2021/0166045 A1* | 6/2021 | Kwak | G06K 9/00255 |

\* cited by examiner

SYSTEMS AND METHODS OF LIVENESS DETERMINATION

BACKGROUND

Authenticating the identity of an individual is an increasingly important function for operators of communication networks, providers of services over communication networks, entities who receive payment for products and services over communications networks, and others due to the growing problems of identity theft and identity fraud. The theft or misrepresentation of information about the identity of an individual used to obtain access to information, products, services, or anything else of value (personally identifiable information), such as identify theft and identify fraud, are serious problems that may cost companies millions of dollars every year, and may affect a wide range of enterprises, including online retailers, insurance companies, healthcare companies, financial institutions, government agencies, and others.

Various methods of authentication of the identity of an individual have been used in an effort to prevent identity theft and identity fraud. For example, access to services over a communication network may be controlled by requiring a username (i.e., a unique identifier) and a password (i.e., an additional piece of "secret information"). Further, some additional non-public information may be required by the service provider, such as a social security number, an answer to a "secret question" beyond a password, and the like. However, such security measures may be vulnerable to identity theft and identity fraud because ensuring the security of such information is difficult. In addition, various types of biometric identifiers (e.g., unique physical characteristics) have been used to assist in verifying an authentication, ranging from non-electronic fingerprinting to electronic voice recognition, thumb scans, iris scans, palm scans, face scans, physiological scans, and the like. No identifier, however, is foolproof, whether non-biometric or biometric. Every biometric reader may be subject to "false accept" and "false reject" errors, and as with non-biometric identifiers, ensuring the security of biometric identifiers is difficult. Further, as with non-biometric identifiers, the reliability of biometric identifiers may change depending on the particular transaction in which the individual's identity is authenticated. The reliability of an individual's identity may change, for example, depending on whether the identity is always authenticated in the same location or is sometimes authenticated in different locations.

Biometric features may themselves be the target of an attack that attempts to copy or reproduce the biometric identifier (e.g., spoofing). For example, a fingerprint or palm print may be imaged (e.g., photographed, photocopied, scanned, etc.) and the image of the fingerprint or palm print may be presented in place of a real fingerprint to fool a scanning device (e.g., a "replay" attack). While some methods of detecting the liveness of a biometric identifier exist, conventional methods of liveness detection typically require additional hardware to be incorporated into a scanning device. For example, hardware may be used to detect additional biometric information such as blood flow or an arterial pulse. Incorporating additional hardware into the scanning device increases the complexity and cost of the device.

SUMMARY

The various aspects include methods of determining liveness of a biometric feature that may be performed by a processor of a computing device. Various aspects may include receiving two or more scans of a biometric feature from a sensor of a source device, determining surface area rates of change of a surface area of the biometric feature, determining location stability rates of changes for one or more locations of the biometric feature, determining presence information rates of change of the biometric feature, generating a liveness score based on the determined location stability rates of change, the surface area rates of change, and the presence information rates of change of the biometric feature, determining whether the generated liveness score meets a liveness threshold, and determining that the biometric feature is a live biometric feature in response to determining that the generated liveness score meets the liveness threshold.

Some aspects may include determining a line thickness rate of change of one or more areas of the biometric feature. In such aspects, generating a liveness score based on the determined location stability rates of change, the surface area rates of change, and the presence information rates of change of the biometric feature may include generating a liveness score based on the determined location stability rates of change, the surface area rates of change, and the presence information rates of change of the biometric feature, and the line thickness rate of change of one or more areas of the biometric feature.

Some aspects may include determining a rate of change of distance between two or more lines of the biometric feature. In such aspects, generating a liveness score based on the determined location stability rates of change, the surface area rates of change, and the presence information rates of change of the biometric feature may include generating a liveness score based on the determined location stability rates of change, the surface area rates of change, and the presence information rates of change of the biometric feature, and rate of change of distance between two or more lines of the biometric feature.

Some aspects may include determining a rate of change of depth change in one or more areas of the biometric feature. In such aspects, generating a liveness score based on the determined location stability value, the surface area change value, and the presence information value of the biometric feature may include generating a liveness score based on the determined location stability value, the surface area change value, the presence information value, and the rate of change of depth in one or more areas of the biometric feature.

In some aspects, generating a liveness score based on the determined location stability value, the surface area change value, and the presence information value of the biometric feature may include generating the liveness score based on a plurality of the determined location stability rates of change, the surface area rates of change, and the presence information rates of change of the biometric feature determined during a scan time period.

Some aspects may include determining that the biometric feature is not a live biometric feature in response to determining that the generated liveness score does not meet the liveness threshold. In some aspects, determining whether the generated liveness score meets a liveness threshold may include determining whether the generated liveness score is within two liveness thresholds. In some aspects, generating a liveness score based on the determined location stability rates of change, the surface area rates of change, and the presence information rates of change of the biometric feature may include generating a normalized curve based on the determined location stability rates of change, the surface area rates of change, and the presence information rates of change of the biometric feature. In some aspects, determining whether the generated liveness score meets a liveness threshold may include determining whether the generated normalized curve meets the liveness threshold.

In some aspects, determining that the biometric feature is not a live biometric feature in response to determining that the generated liveness score does not meet the liveness threshold may include determining that the biometric feature is not a live biometric feature in response to determining that one or more portions of the normalized curve does not meet the liveness threshold. Some aspects may include permitting an attempt to authenticate the biometric feature based on the determination that the biometric feature is a live biometric feature.

Further aspects include a source device including a processor configured with processor-executable instructions to perform operations of the aspect methods described above. Further aspects include a non-transitory processor-readable storage medium having stored thereon processor-executable software instructions configured to cause a processor to perform operations of the aspect methods described above. Further aspects include a computing device that includes means for performing functions of the operations of the aspect methods described above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of the claims.

DETAILED DESCRIPTION

Figure 1:
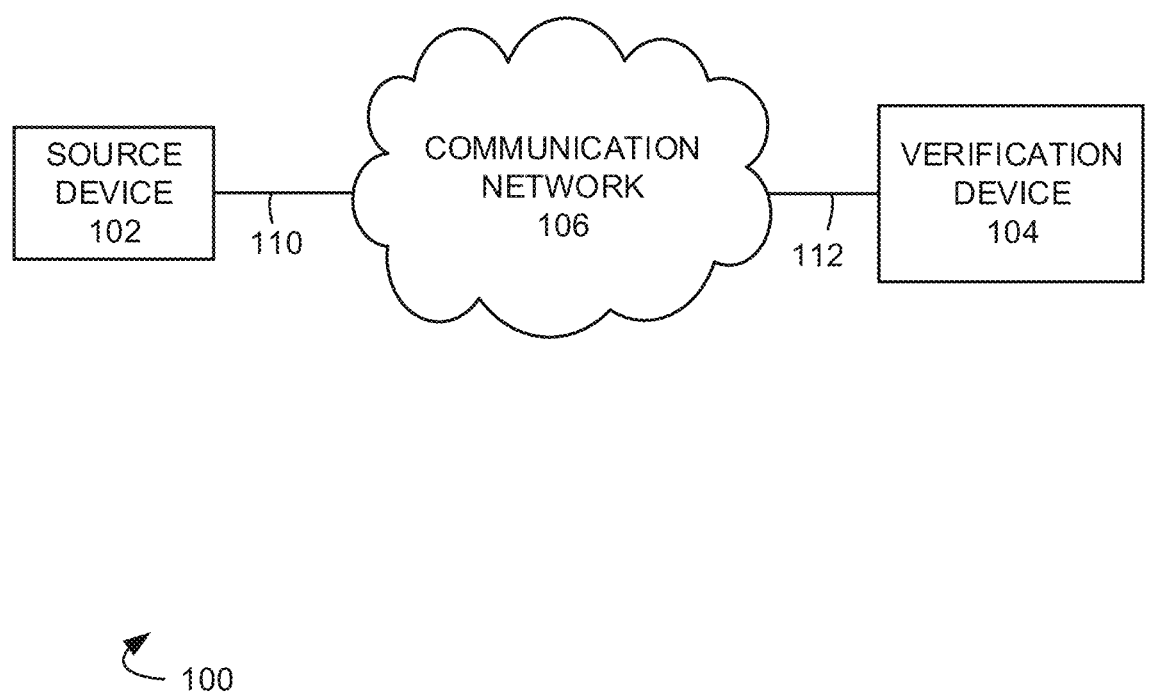
FIG. 1 illustrates a communication system for determining liveness of a biometric feature suitable for use in some embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Biometric features, such as fingerprints, palm prints, and other similar biometric features may be the target of fraud, such as by a replay attack or a spoofing attack. For example, a fingerprint may be imaged, and the image may be presented in place of a real fingerprint to fool a scanning device. A more sophisticated attack may use an image of a fingerprint or palm print that may be applied to or molded into a three-dimensional object to simulate a live finger/palm with the fake fingerprint/palm print.

"Liveness detection" refers to techniques for detecting or distinguishing the presence of a real ("live") biometric identifier from a simulation of the biometric identifier. Conventional methods of liveness detection typically require additional hardware to be incorporated into a scanning device. For example, hardware may be used to detect additional biometric information such as blood flow or an arterial pulse. Incorporating such additional hardware into the scanning device increases the complexity and cost of the device.

Various embodiments provide methods and computing devices configured to implement the methods of determining liveness of a biometric identifier presented to a scanning device. In some embodiments, the methods and computing devices configured to implement the methods may determine liveness from a presented fingerprint. Various embodiments may be implemented by a processor of a source device and/or a processor of a processing node (a "device processor"). Various embodiments increase the efficiency and decrease the cost of conventional systems by enabling a device processor to determine liveness from a presented biometric identifier without the use of additional hardware, e.g., in a scanning device. Some embodiments enable a device processor to determine liveness from a single presented biometric identifier without use of or reference to additional biometric identifiers. Various embodiments provide more efficient and more accurate systems and methods of liveness detection than conventional systems. Various embodiments further provide more efficient and more accurate systems and methods of authentication of a person presenting the biometric feature than conventional systems. Further, various embodiments improve security that may be provided by an access control system using embodiment systems and methods.

In some embodiments, a device processor, such as a processor of a source device and/or a processor of a processing node, may receive two or more scans of a biometric feature from a sensor of a source device. In some embodiments, the processor may perform scans of the biometric feature during a scan time period. In some embodiments, the processor may determine the beginning of the scan time period at a time when a sensor of the source device detects the biometric feature. The processor of the computing device may perform a plurality of scans of a biometric feature very rapidly, such as during a period of seconds or fractions of a second.

When a biometric feature is live, characteristics of the biometric feature may change in expected ways over time. Further, the rate of change of one or more characteristics of the biometric feature may change in expected ways over time. In contrast, when the biometric feature is not live, characteristics of the biometric feature may not change over time, or may change in ways that are not consistent with the manner, degree, or rate by which characteristics of a live biometric feature may change. For example, numerous aspects of a live fingerprint or palm print may change at different rates over time from the time a finger or palm is first applied to (or detected by) a sensor, through a time period during which the finger or palm is more completely applied to the sensor. Further, the rates of change of aspects of the live fingerprint or palm print may stabilize as the finger or palm is fully applied to the sensor and held relatively stably in place. In contrast, aspects of a photograph of a fingerprint or palm print will typically not change over time. That is, at a first time, a sensor may detect no signal, then at a second time the sensor may detect a complete fingerprint or palm print. Further, from the second time to a third time, the sensor may detect no changes to aspects of the photograph of the fingerprint or palm print. As another more subtle example, a three-dimensional model of a finger or palm (e.g., made out of a pliable synthetic material) may exhibit changes in the rates of change of aspects of the modeled fingerprint or palm print, but such changes over time may be different from, or may not exhibit the same characteristics as, detectable rate changes of aspects of a live fingerprint or palm print.

In various embodiments, the processor may determine or measure one or more changes in aspects or characteristics of the biometric feature. Based on the changes in the aspects or characteristics of the biometric feature over time (even over a short period of time), the processor may determine one or more rates of change of the aspects or characteristics of the biometric feature. Based on the determined one or more rates of change of the aspects of the biometric feature, the processor may determine whether the biometric feature is live or not live (a "liveness determination"). Based on the liveness determination, the processor may determine whether the presentation of the purported biometric feature is in fact an attempt at a fraudulent authentication, such as a spoofing attack.

In some embodiments, the processor may determine a location stability rate of change of one or more selected points of the biometric feature. In some embodiments, the processor may determine a surface area rate of change of the biometric feature. In some embodiments, the processor may determine a presence information rate of change of the biometric feature. In some embodiments, the processor may determine a liveness score based on the determined location stability rate of change, the surface area rate of change, and the presence information rate of change of the biometric feature.

In some embodiments, the processor may determine a thickness rate of change of one or more areas of the biometric feature. For example, the processor may determine a rate of change in thickness of one or more lines of the biometric feature during a time period. In some embodiments, the processor may determine a rate of change of distance between two or more lines of the biometric feature. In some embodiments, the processor may determine a depth rate of change in one or more areas of the biometric feature. For example, the processor may determine a rate of change in a depth of an area between two or more lines of the biometric feature. In some embodiments, the processor may determine the liveness score based on the determined location stability rate of change, the surface area rate of change, the presence information rate of change of the biometric feature, the thickness rate of change of the one or more areas of the biometric feature, the rate of change of distance between the two or more lines of the biometric feature, and/or the depth rate of change in one or more areas of the biometric feature.

In some embodiments, the processor may perform a plurality of scans of the biometric feature over time. For example, during a scan time period the processor may perform a plurality of scans of the biometric feature to determine a plurality of location stability values for one or more points of the biometric feature, a plurality of values of a change in surface area of the biometric feature, and a plurality of presence information values of the biometric feature during the time period. In some embodiments, the processor may generate the liveness score based on a plurality of the location stability rates of change, a plurality of surface area rates of change, and a plurality of presence information rates of change determined during the scan time period. In some embodiments, the processor may generate the liveness score based on a plurality of location stability rates of change, surface area rates of change, presence information rates of change of the biometric feature, thickness rates of change of the one or more areas of the biometric feature, rates of change of distance between the two or more lines of the biometric feature, and/or depth rates of change in one or more areas of the biometric feature.

In some embodiments, the processor may generate a liveness score that includes a normalized curve or normalized plot over time of a combination of the determined one or more rates of change. For example, the processor may combine the determined location stability rate of change, the surface area rate of change, the presence information rate of change of the biometric feature, the thickness rate of change of the one or more areas of the biometric feature, the rate of change of distance between the two or more lines of the biometric feature, and/or the depth rate of change in one or more areas of the biometric feature, and the processor may determine a normalized curve over time of the combination of the rate(s) of change. In some embodiments, the processor may determine whether the generated liveness score meets a liveness threshold. In response to determining that the generated liveness score meets the liveness threshold, the processor may determine that the biometric feature is a live biometric feature (i.e., is a real biometric feature that is being currently presented to the source device). In some embodiments, the processor may set an indicator in a data structure indicating whether the biometric feature is a live biometric feature, or is not a live biometric feature (e.g., in a memory of the source device, in a memory of a processing node, or another suitable memory). In some embodiments, the processor may present an alert or indicator that the biometric feature is a live biometric feature, or is not a live biometric feature. In some embodiments, the processor may permit an attempt to authenticate the biometric feature in response to determining that the biometric feature is a live biometric feature. In some embodiments, the processor may prevent or block an attempt to authenticate the biometric feature in response to determining that the biometric feature is not a live biometric feature.

FIG. 1 illustrates a communication system 100 for determining liveness of a biometric feature suitable for use in various embodiments. The communication system may include a source device 102, verification device 104, and a communication network 108. The source device 102 may be configured to receive a biometric feature, and may include a computing device or computing platform such as a point-of-sale device, a desktop, laptop, palmtop, or tablet computing device, a personal digital assistant, an internet access device, a cell phone, a smart phone, a personal digital assistant, or another device capable of receiving an input comprising an identification feature, including combinations thereof. The source device 102 may include a processing system and a memory. The processing system may include a microprocessor and/or other circuitry to retrieve and execute software from storage, and the memory may include a disk drive, flash drive, memory circuitry, or other non-transitory memory device. The memory may store including computer-executable or executable instructions that may be used in the operation of the source device 102. The computer-executable or processor-executable instructions may include computer programs, firmware, an operating system, utilities, drivers, network interfaces, applications, or some other type of codes or instructions. The source device 102 may further include other components such as a power management unit, a control interface unit, and the like. The source device 102 may also include one or more devices for sampling, scanning or detecting an input, including a biometric feature. In some embodiments, the biometric feature may include a fingerprint, a palm print, or another similar biometric feature. In some embodiments, the biometric feature may include a voice sample, a vein pattern in a retina or in an extremity such as a hand or arm, a venous or arterial pulse, a blood pressure, an iris pattern, face recognition data, a handwriting or signature analysis, venous or arterial pulse. In some embodiments, the biometric feature may include any of a variety of combinations of the foregoing. The source device may communicate with the communication network 106 over a communication link 110.

The verification device 104 may include a processing node or other network element (e.g., a server) in communication with the communication network 108 over a communication link 112. The verification device 104 may be configured to receive and process one or more scans of a biometric feature. The verification device 104 may include a processor and/or processing system and associated circuitry to execute or direct the execution of computer-executable instructions, such as software, which may be retrieved from storage, which may include a disk drive, flash drive, memory circuitry, or some other non-transitory memory device, and which may be local or remotely accessible. The software may include computer programs, firmware, or some other form of non-transitory processor-readable or machine-readable instructions, and may include an operating system, utilities, drivers, network interfaces, applications, or some other type of software, including combinations thereof. The verification device 104 may receive instructions and other input at a user interface. Examples of the verification device 104 may include a standalone computing device, a computer system, and a network component, such as a server, and may be accessible, for example, by a wired or wireless connection, or through an indirect connection such as through a computer network or communication network.

In some embodiments, biometric sensing devices, software, and processing devices of the source device 102 and the verification device 104 may be software and hardware agnostic, and may, for example, be used in connection with any operating system and any biometric device complying with such technical standards as ANSI/NIST-IT Biometric Standard, Data Format for the Interchange of Fingerprint, Facial & Other Biometric Information, ANSI/NIST-ITL 1-2011, Update: 2013, Incorporating ANSI/NIST-ITL 1-2011 Sup:Dental & ANSI/NIST-ITL 1-2011, and other internationally recognized biometric standards.

The communication network 108 may include a wired and/or wireless communication network, and may further include processing nodes, routers, gateways, and physical and/or wireless data links for carrying data among various network elements, including combinations thereof, and may include a local area network, a wide area network, and an internetwork (including the Internet). Wired network protocols that may be utilized by the communication network include Transfer Control Protocol (TCP), Internet Protocol (IP), Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). The communication network may also include a wireless network, including base stations, wireless communication nodes, telephony switches, internet routers, network gateways, computer systems, communication links, or some other type of communication equipment, and combinations thereof. Wireless network protocols that may be utilized by the communication network may include code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). The communication network may also include combinations of the foregoing. Other network elements may be present in the communication network that are omitted for clarity, including additional processing nodes, routers, gateways, and physical and/or wireless data links, and in the case of wireless communications systems may further include base stations, base station controllers, gateways, call controllers, and location registers such as a home location register or visitor location register.

The communication links 110 and 112 may include wired or wireless communication links. Wired communication links may include, for example, twisted pair cable, coaxial cable or fiber optic cable, or combinations thereof. Wireless communication links may include a radio frequency, microwave, infrared, or other similar signal. Wireless communication links may include a plurality of carrier signals, frequencies, or frequency bands, each of which may include a plurality of logical channels. Wireless communication links may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Other network elements may be present to facilitate communication in communication system 100 which are omitted for clarity, including additional processing nodes, routers, gateways, and physical and/or wireless data links for carrying data among the various network elements, and in the case of wireless communications systems may further include base stations, base station controllers, gateways, mobile switching centers, dispatch application processors, and location registers such as a home location register or visitor location register.

Figure 2:
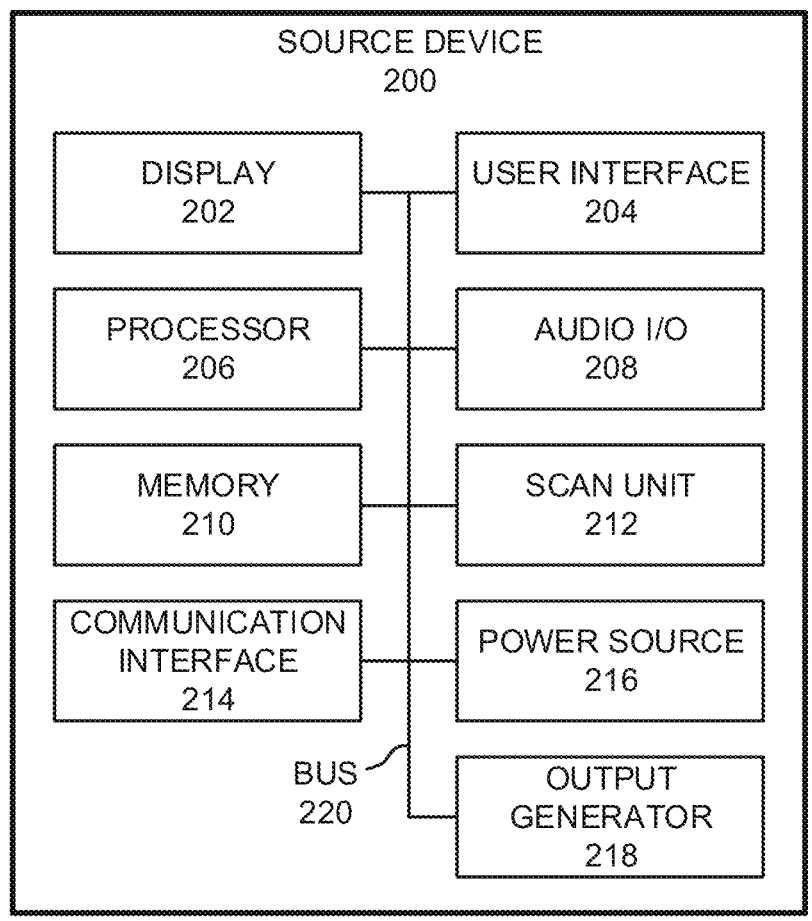
FIG. 2 illustrates a source device suitable for use with various embodiments.

FIG. 2 illustrates a source device 200 suitable for use with various embodiments. With reference to FIGS. 1 and 2, the source device 200 may include a display 202, a user interface 204, a processor 206, an audio input/output 208, a memory 210, a scan unit 212, a communication interface 214, and a power source 216. The display 202 may display information at the direction of the processor 206, and may be coupled with a display driver (not illustrated) to control a display of information on the display 202, including text, images, video, and the like. The display 202 may also be coupled with the user interface 204 to receive input, such as by a touch screen or similar device. Additionally, or alternatively, the user interface 204 may include one or more input devices by which the source device 200 may receive an input, such as a keyboard, a mouse, buttons, keys, knobs, sliders, and the like. The user interface 204 may be used to provide information to the source device 200, to answer questions and/or to respond to queries that may be displayed on the display 202, and to control the operation of the source device 200.

The audio input and output (I/O) 208 may include a speaker to produce sound and/or a microphone to receive sound input. The memory 210 may store data, and may include, for example, a disk drive, a flash drive, a solid state memory device, a memory circuitry, or some other non-transitory memory device, in various forms of volatile and non-volatile memory storage. The memory 210 may store software comprising, for example, computer programs, firmware, or some other form of non-transitory processor-readable or machine-readable instructions, and may include an operating system, utilities, drivers, network interfaces, applications, or some other type of software.

The scan unit 212 may include one or more devices to scan a biometric feature. The scan unit 212 may also include one or more sensors or scanners to detect a biometric feature such as a fingerprint or a palm print. In some embodiments, additionally or alternatively, the scan unit 212 may detect other biometric features such as a voice sample, a vein pattern in a retina or in an extremity such as a hand or arm, a venous or arterial pulse, a blood pressure, an iris pattern, face recognition data, a handwriting or signature analysis, a DNA sample, and the like. Examples of the sensor include a camera (including visible light, infrared, ultraviolet, etc.), and electromagnetic radiation emitter (e.g., of visible light, infrared, ultraviolet, etc.), a charge coupled device, a capacitive sensor, a touch screen input unit, LIDAR, RADAR, a temperature sensor, a pressure sensor, a vibration sensor, an accelerometer, a voice sampler, a voiceprint analyzer, an iris pattern scanner, a vein pattern scanner, a blood pressure detector, a blood vessel pulse detector, a DNA sampler, a scale or other weight detector, a pulse oximeter, an electrocardiogram device, a blood pressure detector, a thermometer, a thermograph, a face recognition scanner, and so forth. The scan unit 212 may use, or may be combined with, the audio I/O 208 to receive voice information or other sound input. Other sensors and detectors are also possible, including combinations of the foregoing.

The communication interface 214 may include a wired and/or wireless communication interface to enable the source device 200 to communicate with another device, for example, directly or over a communication network (such as the communication network 108). The communication interface 214 may also one or more transceivers (not illustrated) to enable the source device 200 to communicate wirelessly. Wireless communication may be short range or long range, and may include short-range communication with another device (e.g., using a short-range communication protocol such as Wi-Fi, Bluetooth, Zigbee, IrDA, and the like) and long-range communication (e.g., using a cellular communication protocol such as GSM, WiMAX, LTE, LTE-Advanced, and the like).

The processor 206 may retrieve and execute software from the memory 210, process data, and may control the operation of elements 202, 204, 208, 210, 212, 214 and 216. Elements 202-216 may communicate over a communication link, such as a communication bus 220. Each of the elements 202-220 may be disposed within, for example, a housing, but this is by no means a requirement or limitation, and the functions of source device 200 may be distributed over two or more devices that may communicate by a wired or wireless local connection, or over a wired or wireless communication network or another distributed communication system.

Figure 3:
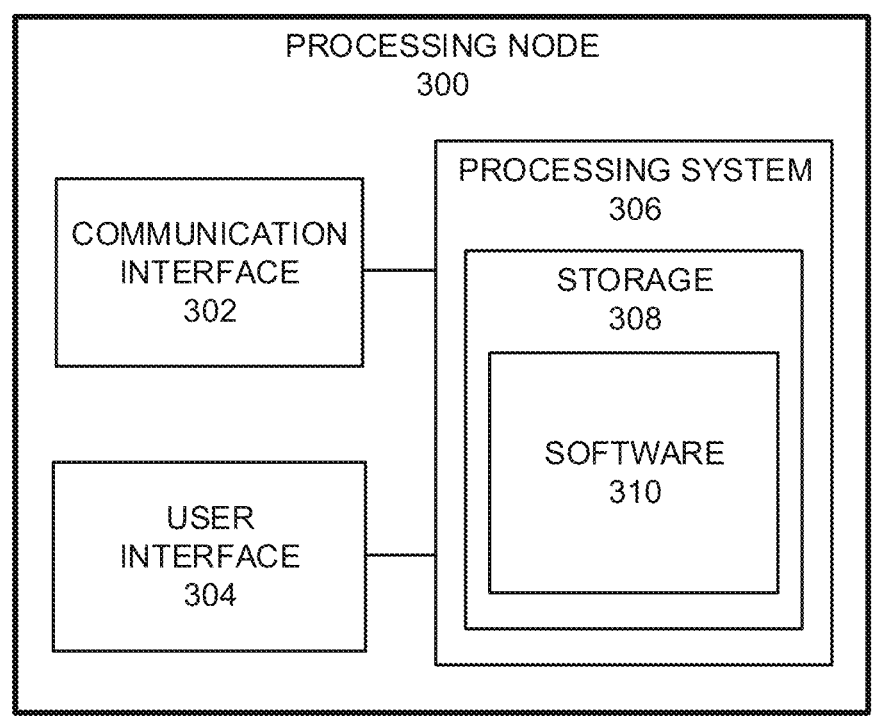
FIG. 3 illustrates a processing node suitable for use with various embodiments.

FIG. 3 illustrates an processing node 300 suitable for use with various embodiments. With reference to FIGS. 1-3, the processing node 300 (e.g., the verification device 104) may include a communication interface 302, a user interface 304, and a processing system 306 in communication with the communication interface 302 and the user interface 304. The processing system 306 may include storage 308, such as a disk drive, flash drive, memory circuitry, or other memory device. The storage 308 may store software 310 which may be used in the operation of the processing node 300. The storage 308 may include a disk drive, flash drive, data storage circuitry, or some other memory apparatus. The software 310 may include computer programs, firmware, or some other form of machine-readable instructions, including an operating system, utilities, drivers, network interfaces, applications, or some other type of software. The processing system 306 may include a microprocessor and other circuitry to retrieve and execute the software 310 from the storage 308. The processing node 300 may further include other components such as a power management unit, a control interface unit, etc., which are omitted for clarity. The communication interface 302 may enable the processing node 300 to communicate with other network elements. The user interface 304 may enable the configuration and control of the operation of the processing node 300.

The processing node 300 may be an adjunct or component of another network element, or the processing node 300 may be another network element of the communication system 100. Further, the functionality of the processing node 300 may be distributed over two or more network elements of a communication system.

FIGS. 4A-4G illustrate scans 400a-400g of a biometric feature according to some embodiments. While a fingerprint is illustrated in FIGS. 4A-4G, any suitable biometric feature may be scanned and analyzed according to some embodiments. With reference to FIGS. 1-4G, a processor of a computing device (e.g., the source device 102) may control a scanning device (e.g., the scan unit 212) to perform scans of a biometric feature. In some embodiments, the processor of the computing device may perform the scans very rapidly, such as during a period of seconds or fractions of a second. In various embodiments, the processor may determine or measure one or more rates of change in aspects or characteristics of the biometric feature based on information determined from the scans.

Figure 4A:
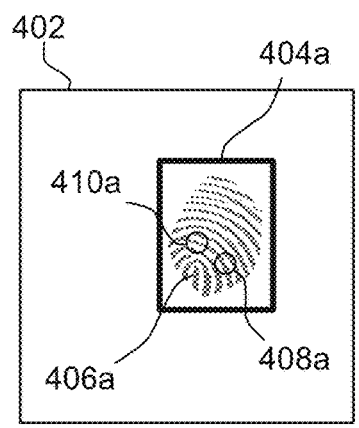
FIGS. 4A-4G illustrate scans of a biometric feature according to some embodiments.

FIG. 4A illustrates a first scan 400a at a first time. In some embodiments, the processor may perform the first scan 400a at the beginning of a scan time period. For example, within a scan area 402 (e.g., the detection area of a sensor, such as of the scan unit 212) the processor may detect an initial or early contact or presence of the biometric feature on the sensor. The processor may determine a first surface area 404a of an area within the scan area 402 that is covered by or in contact with the biometric feature. In some embodiments, the processor may identify one or more points 406 of the biometric feature. In some embodiments, the processor may identify one or more areas 408, 410 of the biometric feature.

In some embodiments, at the first time, the processor may begin to monitor one or more aspects or characteristics of the biometric feature. In some embodiments, the processor may begin to monitor presence information of the biometric feature, for example, location stability of one or more points 406a or areas 408a, 410a, surface area 404a, presence of the biometric feature (e.g., whether there is a "ramp up" over time of the presence of the biometric feature). in some embodiments, the processor may also monitor a thickness of one or more areas of the biometric feature, a distance between one or more lines of the biometric feature, and a rate of change of a depth in one or more areas of the biometric feature.

In some embodiments, the processor may determine a first location of one or more points 406a or areas 408a, 410a. As noted above, the processor may determine a first surface area 404a. In some embodiments, the processor may determine first presence information of the biometric feature. In some embodiments, the processor may determine a first thickness, for example, of one or more lines of the biometric feature (e.g., in the areas 408a, 410a). In some embodiments, the processor may determine a first distance between two or more lines of the biometric feature (e.g., in the areas 408a, 410a). In some embodiments, the processor may determine a first depth of an aspect of the biometric feature (e.g., in the areas 408a, 410a). For example, the processor may determine a first depth of one or more areas between two or more lines of the biometric feature.

Figure 4B:
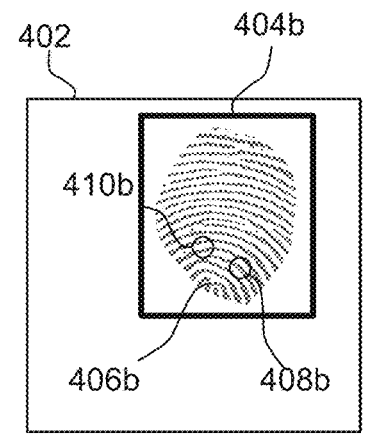

FIG. 4B illustrates a second scan 400b performed at a second time after the first scan 400a. Within the scan area 402, the processor may determine a second surface area 404b that is covered by or in contact with the biometric feature. In some embodiments, the processor may determine a difference, if any, between the first surface area 404a and the second surface area 404b. In some embodiments, as illustrated in the second scan 400b, the second surface area 404b may be larger than the first surface area 404a. For example, as a finger or palm is pressed onto a sensor surface, the finger or palm may slightly deform causing a greater surface area of the finger or palm to contact or cover the sensor.

In some embodiments, the processor may continue to monitor the one or more aspects or characteristics of the biometric feature. In some embodiments, the processor may determine a second location of one or more points 406b or areas 408b, 410b. The processor may determine the second surface area 404b. In some embodiments, the processor may determine second presence information of the biometric feature. In some embodiments, the processor may determine a second thickness, for example, of one or more lines of the biometric feature (e.g., in the areas 408b, 410b). In some embodiments, the processor may determine a second distance between two or more lines of the biometric feature (e.g., in the areas 408b, 410b). In some embodiments, the processor may determine a second depth of an aspect of the biometric feature (e.g., in the areas 408b, 410b). For example, the processor may determine a depth of one or more areas between two or more lines of the biometric feature. In some embodiments, as the biometric feature deforms, the thickness of one or more lines of the biometric feature may increase, the distance between two or more lines of the biometric feature may increase, and/or the depth of an aspect of the biometric feature may decrease. In some embodiments, the processor may determine the degree of change of any or all of the aspects of the biometric feature from the first scan 400a to the second scan 400b. In some embodiments, the processor may determine a rate of change of any or all of the aspects of the biometric feature from the first scan 400a to the second scan 400b.

Figure 4C:
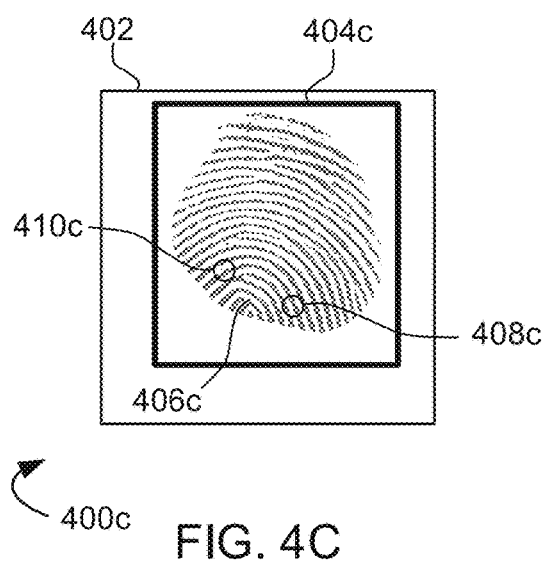

FIG. 4C illustrates a third scan 400c at a third time after the second scan 400b. Within the scan area 402, the processor may determine a third surface area 404c that is covered by or in contact with the biometric feature. In some embodiments, the processor may determine a difference, if any, between the second surface area 404b and the third surface area 404c. For example, as illustrated in the third scan 400c, the third surface area 404c may be larger than the second surface area 404b, e.g., owing to further deformation of the finger or palm as more of the finger or palm comes into contact with the sensor.

In some embodiments, the processor may continue to monitor the one or more aspects or characteristics of the biometric feature. In some embodiments, the processor may determine a third location of one or more points 406c or areas 408c, 410c. The processor may determine the third surface area 404c. In some embodiments, the processor may determine third presence information of the biometric feature. In some embodiments, the processor may determine a third thickness, for example, of one or more lines of the biometric feature (e.g., in the areas 408c, 410c). In some embodiments, the processor may determine a third distance between two or more lines of the biometric feature (e.g., in the areas 408c, 410c). In some embodiments, the processor may determine a third depth of an aspect of the biometric feature (e.g., in the areas 408c, 410c). For example, the processor may determine a depth of one or more areas between two or more lines of the biometric feature. In some embodiments, as the biometric feature deforms, the thickness of one or more lines of the biometric feature may increase, the distance between two or more lines of the biometric feature may increase, and/or the depth of an aspect of the biometric feature may decrease. In some embodiments, the processor may determine the degree of change of any or all of the aspects of the biometric feature from the second scan 400b to the third scan 400c. In some embodiments, the processor may determine the rate of change of any or all of the aspects of the biometric feature from the second scan 400b to the third scan 400c.

Figure 4D:
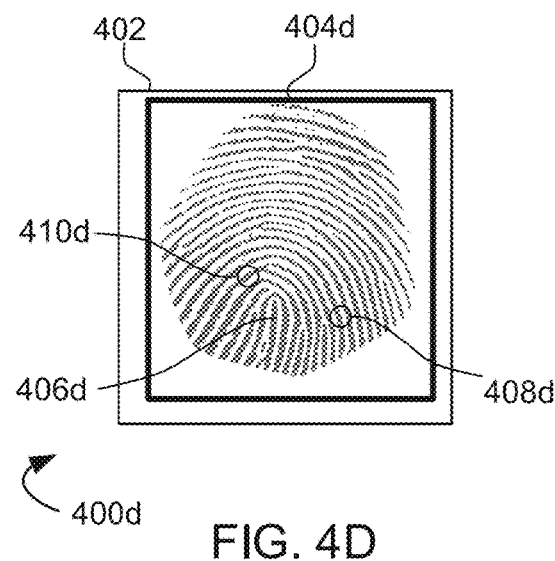

FIG. 4D illustrates a fourth scan 400d at a fourth time after the third scan 400c. Within the scan area 402, the processor may determine a fourth surface area 404d that is covered by or in contact with the biometric feature. In some embodiments, the processor may determine a difference, if any, between the third surface area 404c and the fourth surface area 404d. For example, as illustrated in the fourth scan 400d, the fourth surface area 404d may be larger than the third surface area 404c, e.g., owing to further deformation of the finger or palm as more of the finger or palm comes into contact with the sensor.

In some embodiments, the processor may determine a fourth location of one or more points 406d or areas 408d, 410d. The processor may determine the fourth surface area 404d. In some embodiments, the processor may determine fourth presence information of the biometric feature. In some embodiments, the processor may determine a fourth thickness, for example, of one or more lines of the biometric feature (e.g., in the areas 408*d*, 410*d*). In some embodiments, the processor may determine a fourth distance between two or more lines of the biometric feature (e.g., in the areas 408*d*, 410*d*). In some embodiments, the processor may determine a fourth depth of an aspect of the biometric feature (e.g., in the areas 408*d*, 410*d*). For example, the processor may determine a depth of one or more areas between two or more lines of the biometric feature. In some embodiments, as the biometric feature further deforms, the thickness of one or more lines of the biometric feature may increase, the distance between two or more lines of the biometric feature may increase, and/or the depth of an aspect of the biometric feature may decrease. In some embodiments, the processor may determine the degree of change of any or all of the aspects of the biometric feature from the third scan 400*c* to the fourth scan 400*d*. In some embodiments, the processor may determine the rate of change of any or all of the aspects of the biometric feature from the third scan 400*c* to the fourth scan 400*d*.

Figures 4E, 4F:
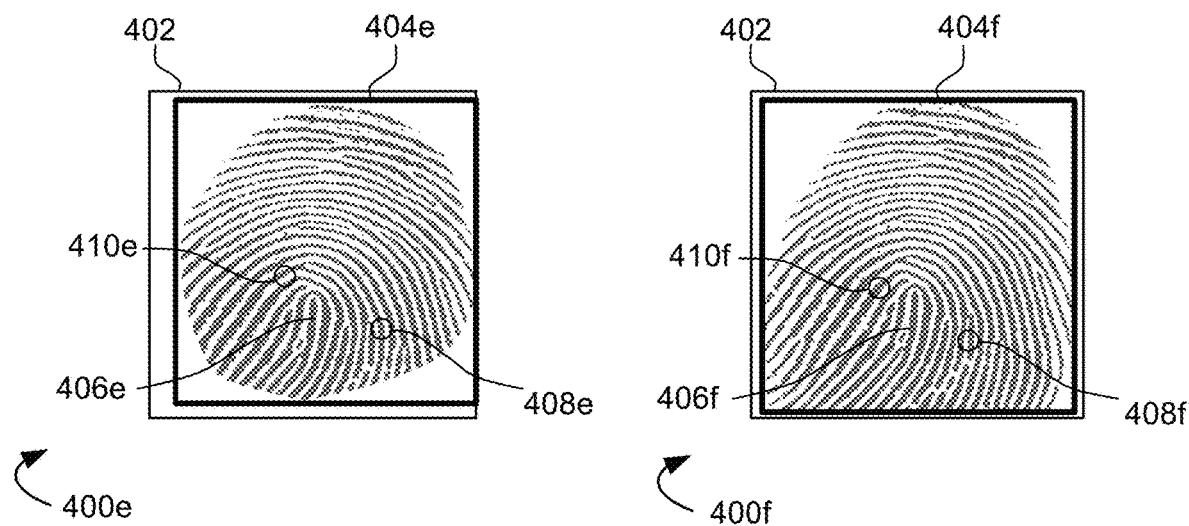

FIG. 4E illustrates a fifth scan 400*e* at a fifth time. In some embodiments, the processor may perform the fifth scan 400*e* at a time after the fourth scan 400*d*. Within the scan area 402, the processor may determine a fifth surface area 404*e* that is covered by or in contact with the biometric feature. In some embodiments, the processor may determine a difference, if any, between the fourth surface area 404*d* and the fifth surface area 404*e*. For example, as illustrated in the fifth scan 400*e*, the fifth surface area 404*e* may be larger than the fourth surface area 404*c*, e.g., owing to further deformation of the finger or palm as more of the finger or palm comes into contact with the sensor.

In some embodiments, the processor may continue to monitor the one or more aspects or characteristics of the biometric feature. In some embodiments, the processor may determine a fifth location of one or more points 406*e* or areas 408*e*, 410*e*. The processor may determine the third surface area 404*e*. In some embodiments, the processor may determine third presence information of the biometric feature. In some embodiments, the processor may determine a fifth thickness, for example, of one or more lines of the biometric feature (e.g., in the areas 408*e*, 410*e*). In some embodiments, the processor may determine a fifth distance between two or more lines of the biometric feature (e.g., in the areas 408*e*, 410*e*). In some embodiments, the processor may determine a fifth depth of an aspect of the biometric feature (e.g., in the areas 408*e*, 410*e*). For example, the processor may determine a depth of one or more areas between two or more lines of the biometric feature. In some embodiments, the processor may determine the degree of change of any or all of the aspects of the biometric feature from the fourth scan 400*d* to the fifth scan 400*e*. In some embodiments, the processor may determine the rate of change of any or all of the aspects of the biometric feature from the fourth scan 400*d* to the fifth scan 400*e*.

FIG. 4F illustrates a sixth scan 400*f* at a sixth time. In some embodiments, the processor may perform the sixth scan 400*f* at a time after the fifth scan 400*e*. Within the scan area 402, the processor may determine a sixth surface area 404*f* that is covered by or in contact with the biometric feature. In some embodiments, the processor may determine a difference, if any, between the fifth surface area 404*e* and the sixth surface area 404*f*. For example, as illustrated in the sixth scan 400*f*, the sixth surface area 404*f* may be larger than the fifth surface area 404*e*, e.g., owing to further deformation of the finger or palm as more of the finger or palm contacts the sensor.

In some embodiments, the processor may continue to monitor the one or more aspects or characteristics of the biometric feature. In some embodiments, the processor may determine a sixth location of one or more points 406*f* or areas 408*f*, 410*f*. The processor may determine the sixth surface area 404*f*. In some embodiments, the processor may determine sixth presence information of the biometric feature. In some embodiments, the processor may determine a sixth thickness, for example, of one or more lines of the biometric feature (e.g., in the areas 408*f*, 410*f*). In some embodiments, the processor may determine a sixth distance between two or more lines of the biometric feature (e.g., in the areas 408*f*, 410*f*). In some embodiments, the processor may determine a sixth depth of an aspect of the biometric feature (e.g., in the areas 408*f*, 410*f*). For example, the processor may determine a depth of one or more areas between two or more lines of the biometric feature. In some embodiments, the processor may determine the degree of change of any or all of the aspects of the biometric feature from the fifth scan 400*e* to the sixth scan 400*f*. In some embodiments, the processor may determine the rate of change of any or all of the aspects of the biometric feature from the fifth scan 400*e* to the sixth scan 400*f*.

Figure 4G:
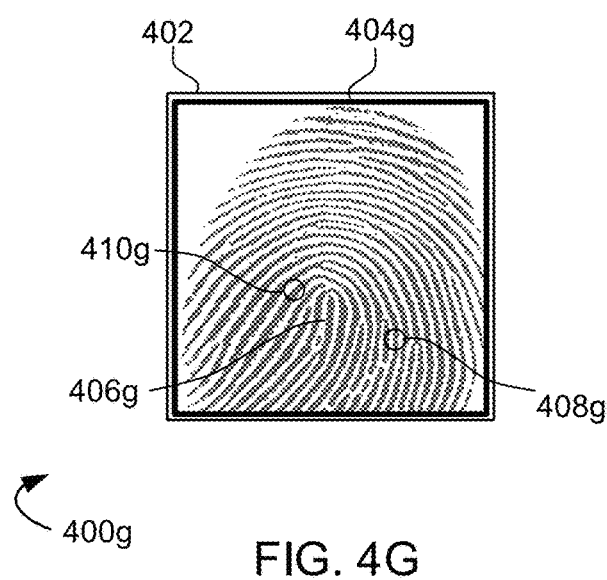

FIG. 4G illustrates a seventh scan 400*g* at a seventh time. In some embodiments, the processor may perform the seventh scan 400*g* at a time after the sixth scan 400*f*. Within the scan area 402, the processor may determine a seventh surface area 404*g* that is covered by or in contact with the biometric feature. In some embodiments, the processor may determine a difference, if any, between the sixth surface area 404*f* and the seventh surface area 404*g*. For example, as illustrated in the seventh scan 400*g*, the seventh surface area 404*g* may be substantially the same surface area as the sixth surface area 404*f*. In this example, the change from the surface area 404*f* to the surface area 404*g* has become relatively stable, and the rate of change from the surface area 404*f* to the surface area 404*g* has decreased. In some embodiments, the processor may determine whether a surface area has reached relative stability, for example, by determining that the surface area of the biometric feature has not substantially changed from scan to scan.

In some embodiments, the processor may continue to monitor the one or more aspects or characteristics of the biometric feature. In some embodiments, the processor may determine a seventh location of one or more points 406*g* or areas 408*g*, 410*g*. The processor may determine the seventh surface area 404*g*. In some embodiments, the processor may determine seventh presence information of the biometric feature. In some embodiments, the processor may determine a seventh thickness, for example, of one or more lines of the biometric feature (e.g., in the areas 408*g*, 410*g*). In some embodiments, the processor may determine a seventh distance between two or more lines of the biometric feature (e.g., in the areas 408*g*, 410*g*). In some embodiments, the processor may determine a seventh depth of an aspect of the biometric feature (e.g., in the areas 408*g*, 410*g*). For example, the processor may determine a depth of one or more areas between two or more lines of the biometric feature. In some embodiments, the processor may determine the degree of change of any or all of the aspects of the biometric feature from the sixth scan 400*f* to the seventh scan 400*g*. In some embodiments, the processor may determine the rate of change of any or all of the aspects of the biometric feature from the sixth scan 400*f* to the seventh scan 400g. For example, the processor may determine that there is substantially little or no change of one or more aspects or characteristics of the biometric feature from the sixth scan 400f to the seventh scan 400g.

Figure 5A:
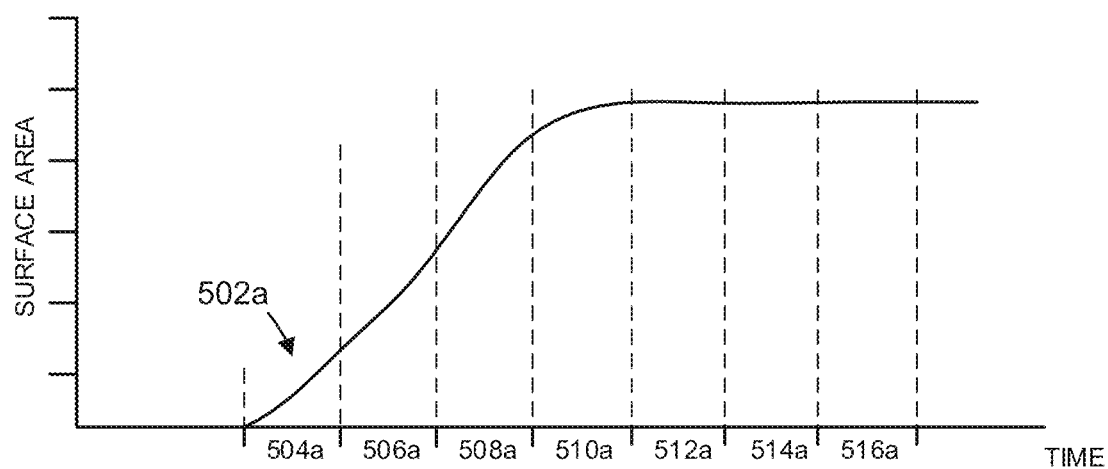
FIGS. 5A-5C illustrate plots of a biometric feature surface area over time according to some embodiments.
Figure 5B:
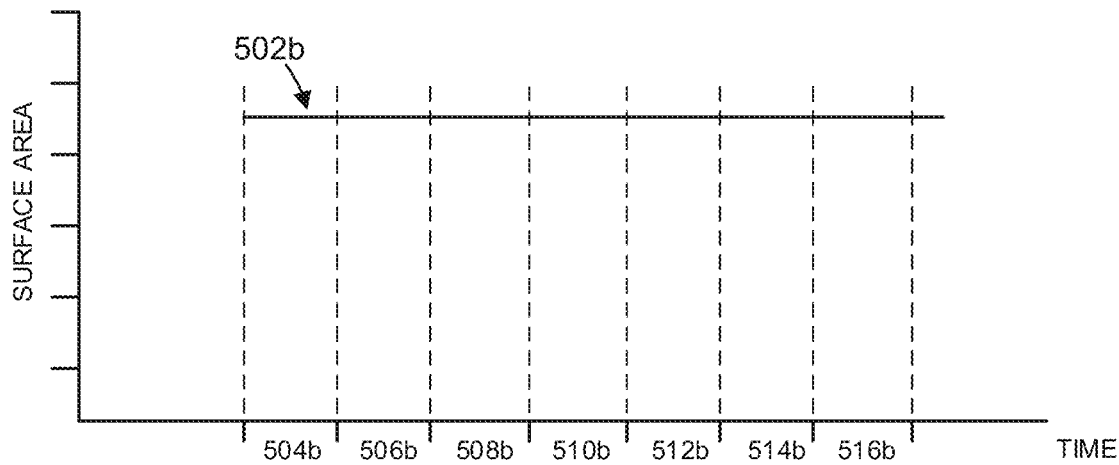
Figure 5C:
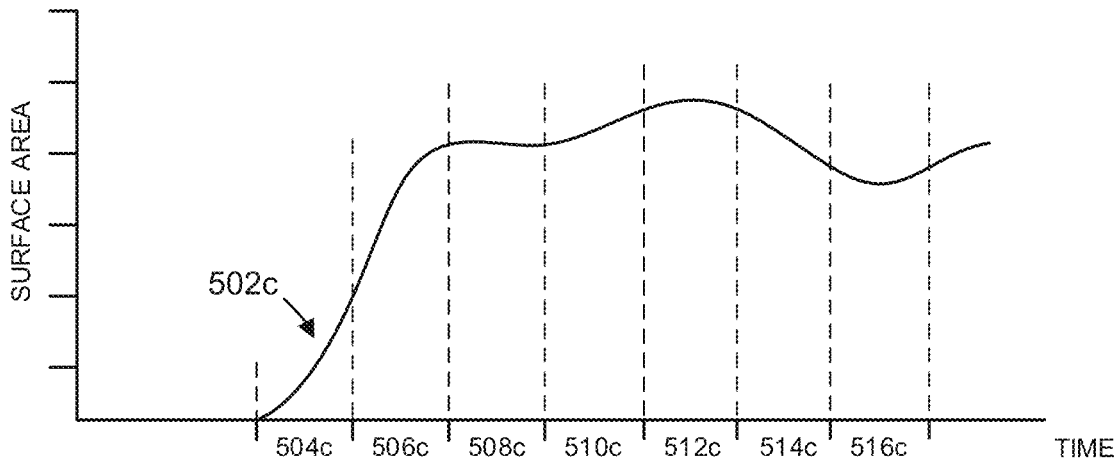

FIGS. 5A-5C illustrate plots of a biometric feature surface area over time according to some embodiments. With reference to FIGS. 1-5C, a processor of a source device (e.g., the source device 202) may determine a biometric feature surface area based on a signal from a sensor of the source device (e.g., the scan unit 212).

In some embodiments, the processor may determine that a surface area 502a (FIG. 5A) of a biometric feature may change over time. The surface area 502a over time illustrates changes in the surface area 502a, and rates of change in the surface area, that are consistent with a live biometric feature. In some embodiments, the processor may determine that the surface area 502a increases over time from no signal to a relatively stable signal over a period of time. In some embodiments, the processor may determine a rate of change over time of the surface area 502a based on the detected changes in the surface area 502a (e.g., based on the surface areas 404a-404g). In some embodiments, the processor may determine a rate of change of the surface area 502a over one or more segments of time, such as segments 504a, 506a, 508a, 510a, 512a, 514a, and 516a. In such embodiments, the processor may determine a plurality of rates of change of the surface area of the biometric feature over a period of time.

In some embodiments, the processor may determine that a surface area 502b (FIG. 5B) exhibits little or no change over time. For example, the processor may determine that the surface area 502b jumps from no signal to a substantially steady-state over a very short time period. Further, the processor may determine that the rate of change of the surface area 502b is very small or approaches zero. In some embodiments, the detected lack of change over time of the surface area 502b may indicate that a biometric feature is not live. For example, a photograph of a fingerprint may exhibit the surface area change characteristics illustrated in the detected surface area 502b. In some embodiments, the processor may determine little or no rate(s) of change over one or more segments of time, such as segments 504b, 506b, 508b, 510b, 512b, 514b, and 516b.

In some embodiments, the processor may determine that a surface area 502c (FIG. 5C) may change over time, but exhibits characteristics inconsistent with a live biometric feature. For example, a synthetic or manufactured finger (e.g., of a pliable material other than human skin) may exhibit the surface area change characteristics illustrated in the detected surface area 502c. In some embodiments, the processor may determine a rate of change over time of the surface area 502c. In some embodiments, the processor may determine a rate of change over one or more segments of time, such as segments 504c, 506c, 508c, 510c, 512c, 514c, and 516c. In such embodiments, the processor may determine a plurality of rates of change of the surface area of the biometric feature over a period of time.

Figure 6A:
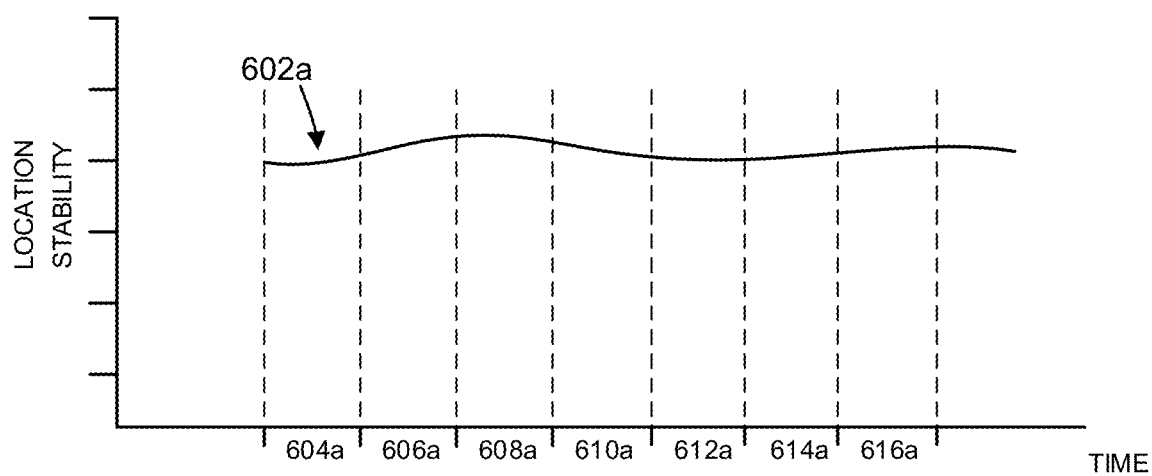
FIGS. 6A-6C illustrate plots of biometric feature location stability over time according to some embodiments.
Figure 6B:
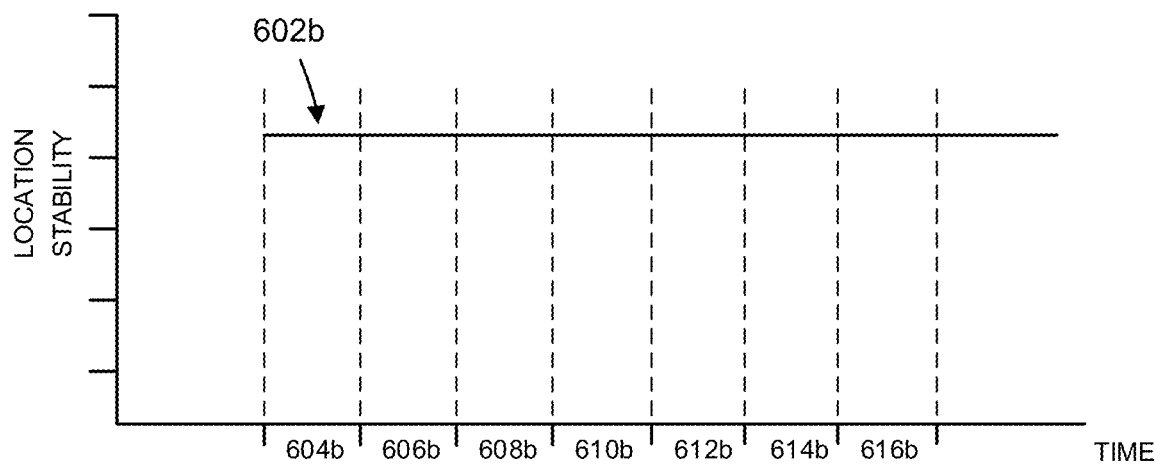
Figure 6C:
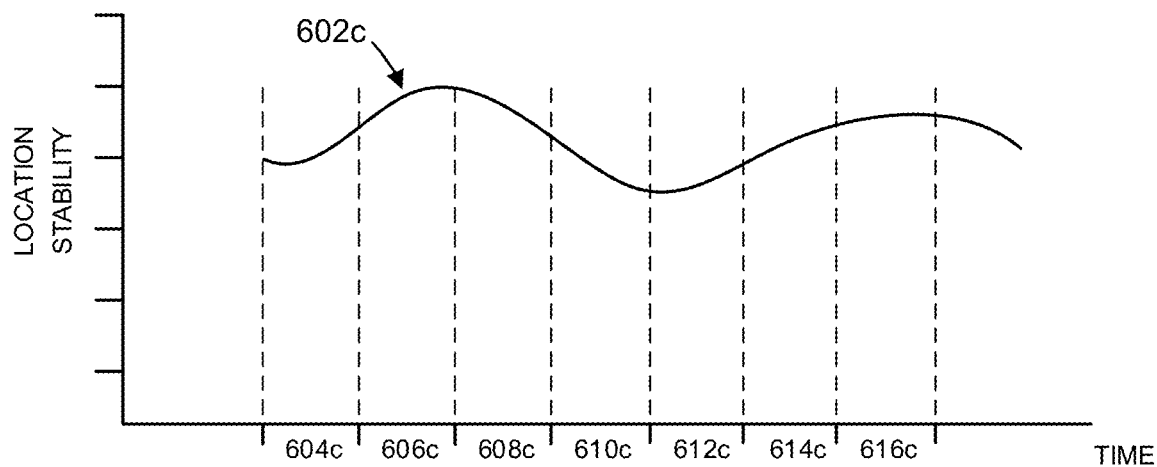

FIGS. 6A-6C illustrate plots of biometric feature location stability over time according to some embodiments. With reference to FIGS. 1-6C, a processor of a source device (e.g., the source device 202) may determine a stability of a location of the biometric feature based on a signal from a sensor of the source device (e.g., the scan unit 212).

In some embodiments, the processor may determine that one or more locations of the biometric feature (e.g., the points 406a-406g, the areas 408a-408g, 410a-410g) may exhibit a location stability 602a (FIG. 6A) over time having some motion or instability. In some embodiments, the processor may determine a rate of change of the location stability of one or more locations of the biometric feature over time. In some embodiments, the determined rate of change over time of the biometric feature stability 602a may indicate that a biometric feature is live biometric feature. In some embodiments, the processor may determine a rate of change of the location stability 602a over one or more segments of time, such as segments 604a, 606a, 608a, 610a, 612a, 614a, and 616a. In such embodiments, the processor may determine a plurality of rates of change of the location stability of the one or more locations of the biometric feature over a period of time.

In some embodiments, the processor may determine little or no change over time of the location stability (or little or no change in the rates of change of the location stability) of the one or more locations of the biometric feature 602b (FIG. 6B). In some embodiments, the location stability of the one or more locations may exhibit a substantially steady state over time. In some embodiments, the determined substantial lack of change in the rates of change over time of the location stability 602b may indicate that a biometric feature is not live. For example, a photograph of a fingerprint may exhibit the little or no rates of change of location stability illustrated in the biometric feature stability 602b. In some embodiments, the processor may determine little or no rate of change of the location stability 602b over one or more segments of time, such as segments 604b, 606b, 608b, 610b, 612b, 614b, and 616b. In such embodiments, the processor may determine a plurality of rates of change of the location stability of the one or more locations of the biometric feature over a period of time.

In some embodiments, the processor may determine a rate (or rates) of change over time of biometric feature location stability that is inconsistent with a live biometric feature. In some embodiments, the processor may determine rate(s) of change of a biometric feature 602c (FIG. 6C) that are inconsistent with a live biometric feature. Such determined rate(s) of change of the biometric feature 602c may indicate the presence of, for example, a synthetic or manufactured finger (e.g., of a pliable material that is not human skin), and thus, that the biometric feature is not live. In some embodiments, the processor may determine a rate of change of the location stability 602c over one or more segments of time, such as segments 604c, 606c, 608c, 610c, 612c, 614c, and 616c. In such embodiments, the processor may determine a plurality of rates of change of the location stability of the one or more points of the biometric feature over a period of time.

Figure 7A:
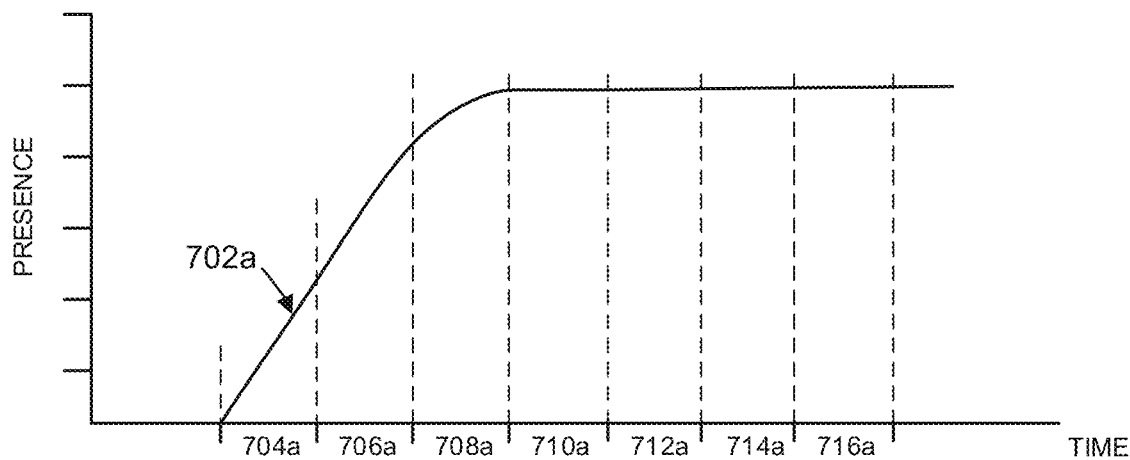
FIGS. 7A-7C illustrate plots of biometric feature presence information over time according to some embodiments.
Figure 7B:
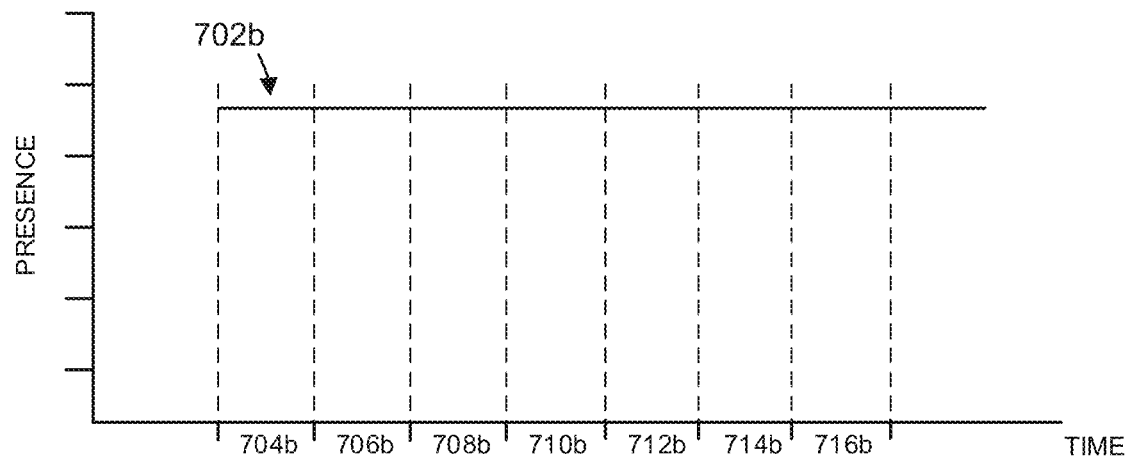
Figure 7C:
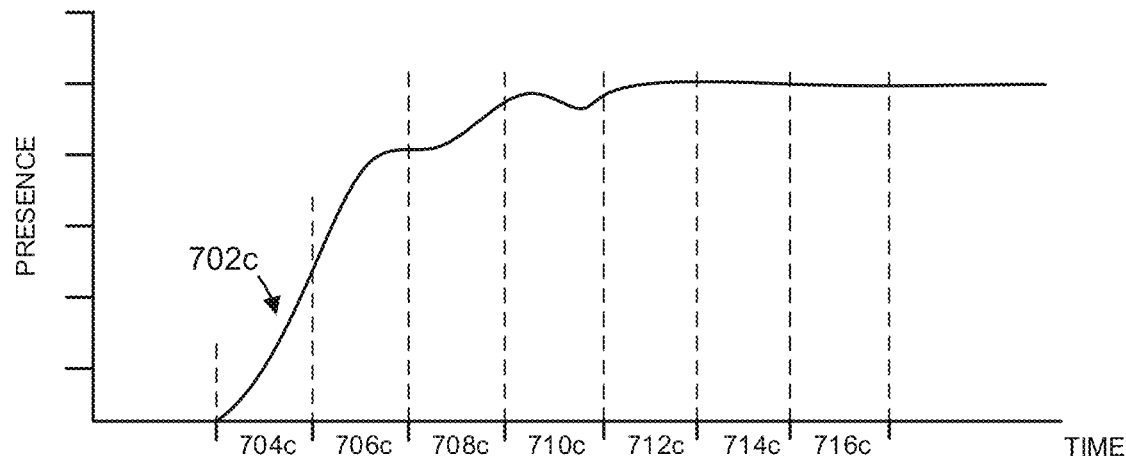

FIGS. 7A-7C illustrate plots of biometric feature presence information over time according to some embodiments. With reference to FIGS. 1-7C, a processor of a source device (e.g., the source device 202) may determine biometric feature presence information based on a signal from a sensor of the source device (e.g., the scan unit 212).

In some embodiments, the processor may determine that the presence information 702a of a biometric feature (FIG. 7A) increases relatively smoothly over time, and then stabilizes at a relatively steady state. In some embodiments, the relatively smooth increase over time of the and/or the stabilization of the presence information 702a may indicate that a biometric feature is live. In some embodiments, the processor may determine a rate of change of the presence information 702a of the biometric feature over time, such as over segments 704a, 706a, 708a, 710a, 712a, 714a, and 716a. In such embodiments, the processor may determine a plurality of rates of change of the presence information of the biometric feature over a period of time.

In some embodiments, the processor may determine that presence information 702b (FIG. 7B) of the biometric feature exhibits little or no change over time, and little or no change in the rates of change over time. For example, the biometric feature presence lack any "ramp up" (e.g., may jump from no signal to a substantially steady state over a very short time period). In some embodiments, the detected lack of change over time of the biometric feature presence 702b may indicate that a biometric feature is not live. For example, a photograph of a fingerprint may exhibit the biometric feature presence 702b. In some embodiments, the processor may determine little or no change in rates of change of the presence 702b of the biometric feature over time, such as over segments 704b, 706b, 708b, 710b, 712b, 714b, and 716b. In such embodiments, the processor may determine a plurality of rates of change of the presence information of the biometric feature over a period of time.

In some embodiments, the processor may determine that presence information 702c (FIG. 7C) of the biometric feature changes over time in a manner inconsistent with a natural biometric feature. Detecting such a manner of change over time of the presence of the biometric feature may indicate the presence of, for example, a synthetic or manufactured finger (e.g., of a pliable material), and thus, that the biometric feature is not live. In some embodiments, the processor may determine a rate of change of presence information 702c of the biometric feature over one or more segments of time, such as segments 704c, 706c, 708c, 710c, 712c, 714c, and 716c. In such embodiments, the processor may determine a plurality of rates of change of the presence information of the biometric feature over a period of time.

Figure 8A:
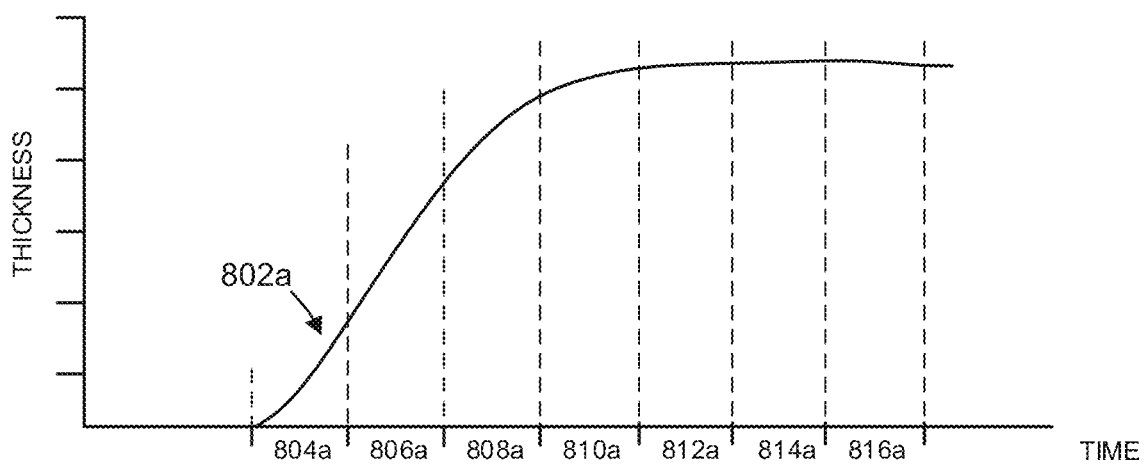
FIGS. 8A-8C illustrate plots of biometric feature line thickness over time according to some embodiments.
Figure 8B:
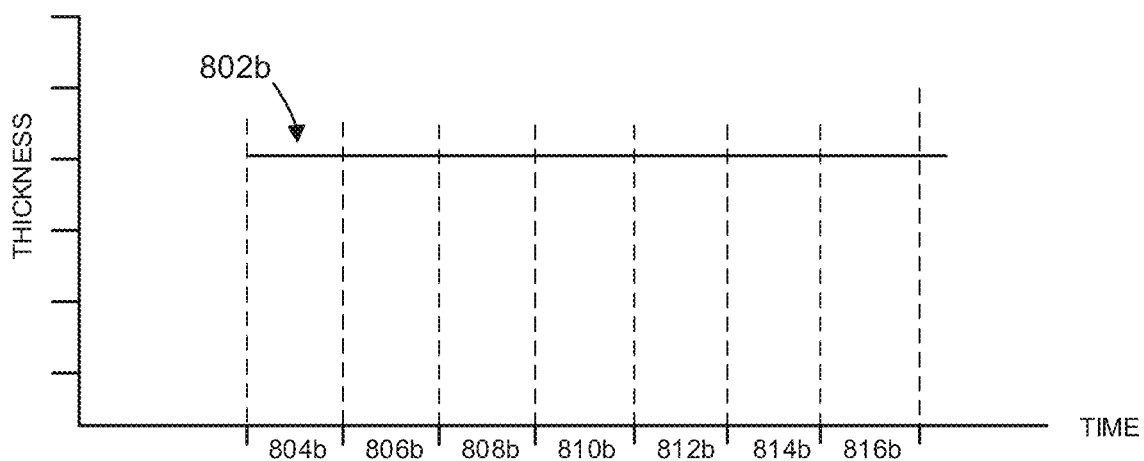
Figure 8C:
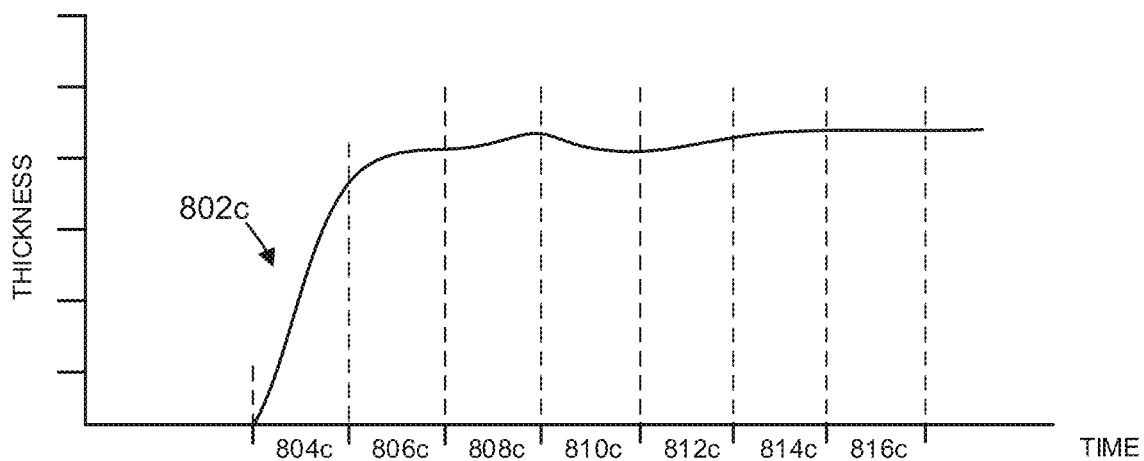

FIGS. 8A-8C illustrate plots of biometric feature line thickness over time according to some embodiments. With reference to FIGS. 1-8C, a processor of a source device (e.g., the source device 202) may determine a biometric feature line thickness based on a signal from a sensor of the source device (e.g., the scan unit 212).

In some embodiments, the processor may determine that a line thickness 802a of a biometric feature (FIG. 8A) (for example, the thickness of a line in the area 408a-408g, 410a-410g) increases relatively smoothly over time, and then stabilizes at a relatively steady state. In some embodiments, the determined stabilization of the biometric feature line thickness over a threshold time range or threshold time period 804a may indicate that a biometric feature is live. In some embodiments, the processor may determine a rate of change of the line thickness 802a over one or more segments of time, such as segments 804a, 806a, 808a, 810a, 812a, 814a, and 816a. In such embodiments, the processor may determine a plurality of rates of change of the line thickness of the biometric feature over a period of time. In some embodiments, the processor may determine a plurality of rates of change of the thickness of two or more lines of the biometric feature.

In some embodiments, the processor may determine a biometric feature line thickness 802b (FIG. 8B) that exhibits little or no change over time. Such lack of change, or lack of changes in the rate of change, may indicate that a biometric feature is not live. For example, a photograph of a fingerprint may exhibit the biometric feature line thickness 802b. In some embodiments, the processor may determine a rate of change of the line thickness 802b over one or more segments of time, such as segments 804b, 806b, 808b, 810b, 812b, 814b, and 816b. In some embodiments, the processor may determine a plurality of rates of change of the thickness of two or more lines of the biometric feature.

In some embodiments, the processor may determine a biometric feature line thickness 802c (FIG. 8C) that changes over time (and includes changes in the rates of change over time) in a manner inconsistent with a live biometric feature. Such changes in the rate of change in the biometric feature line thickness over time may indicate the presence of, for example, a synthetic or manufactured finger, and thus, that the biometric feature is not live. In some embodiments, the processor may determine a rate of change of the line thickness 802c over one or more segments of time, such as segments 804c, 806c, 808c, 810c, 812c, 814c, and 816c. In such embodiments, the processor may determine a plurality of rates of change of the line thickness of the biometric feature over a period of time. In some embodiments, the processor may determine a plurality of rates of change of the thickness of two or more lines of the biometric feature.

Figure 9A:
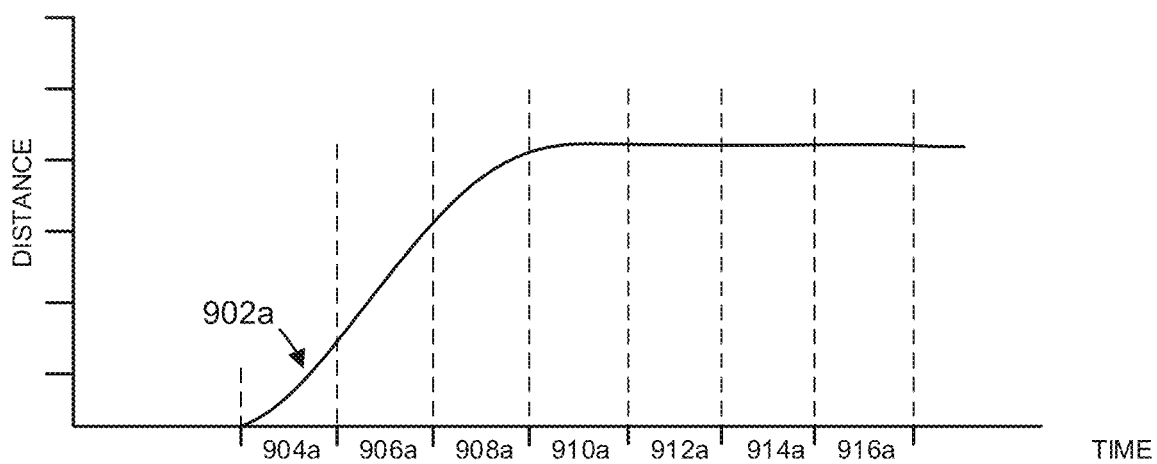
FIGS. 9A-9C illustrate plots of distance between lines of a biometric feature over time according to some embodiments.
Figure 9B:
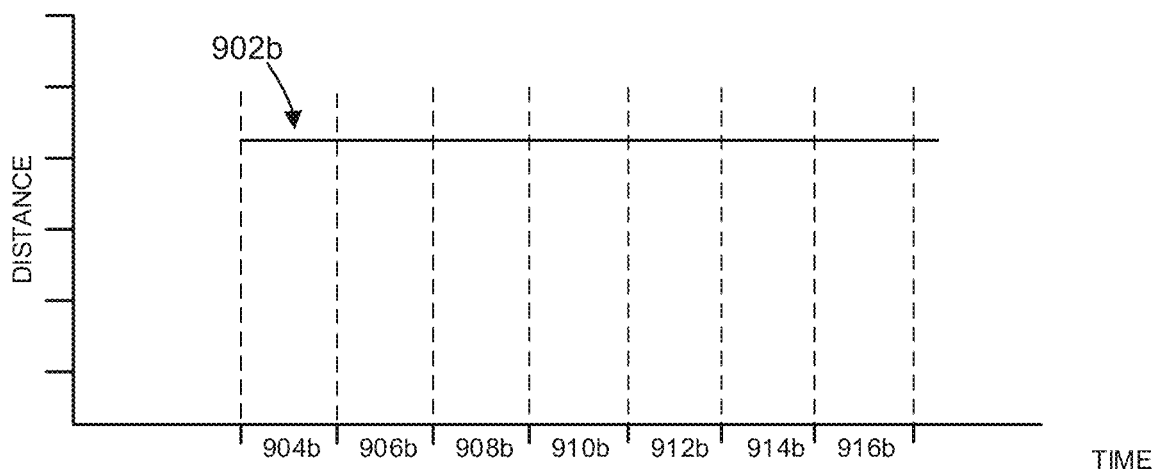
Figure 9C:
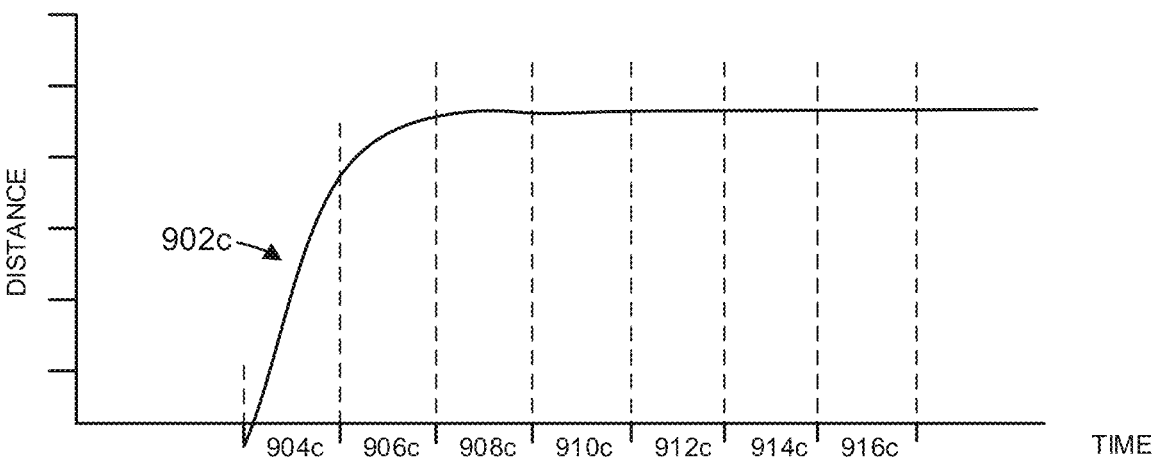

FIGS. 9A-9C illustrate plots of distance between lines of a biometric feature over time according to some embodiments. With reference to FIGS. 1-9C, a processor of a source device (e.g., the source device 202) may determine a biometric feature line thickness based on a signal from a sensor of the source device (e.g., the scan unit 212).

In some embodiments, the processor may determine that a distance between lines of a biometric feature 902a of a biometric feature (FIG. 9A) (e.g., in the areas 408a-408g, 410a-410g) changes relatively smoothly over time, and then stabilizes at a relatively steady state. In some embodiments, the behavior of the distance between biometric feature lines over time may indicate that the biometric feature is live. In some embodiments, the processor may determine a rate of change over time of the distance between lines of the biometric feature 902a. In some embodiments, the processor may determine a rate of change of the surface area 902a over one or more segments of time, such as segments 904a, 906a, 908a, 910a, 912a, 914a, and 916a. In such embodiments, the processor may determine a plurality of rates of change of the thickness of lines of the biometric feature over a period of time.

In some embodiments, the processor may determine that the distance between biometric feature lines 902b (FIG. 9B) exhibits little or no change over time, or little or no change in the rates of change of distance over time. In some embodiments, such lack of change may indicate that a biometric feature is not live. For example, a photograph of a fingerprint may exhibit the biometric feature line thickness 902b. In some embodiments, the processor may determine little or no rate(s) of change over one or more segments of time, such as segments 904b, 906b, 908b, 910b, 912b, 914b, and 916b. In such embodiments, the processor may determine a plurality of rates of change of the thickness of lines of the biometric feature over a period of time.

In some embodiments, the processor may determine that the distance between biometric feature lines 902c (FIG. 9C) changes in a manner inconsistent with a live biometric feature. For example, the processor may determine that a distance between biometric feature lines that stabilizes too rapidly. In some embodiments, the processor may determine that two or more rates of change of the distance between lines of the biometric feature change in a manner inconsistent with a live biometric feature. Such behavior may indicate the presence of, for example, a synthetic or manufactured finger, and thus, that the biometric feature is not live. In some embodiments, the processor may determine a rate of change over time of the distance between biometric feature lines 902c. In some embodiments, the processor may determine a rate of change of distance between biometric feature lines over one or more segments of time, such as segments 904c, 906c, 908c, 910c, 912c, 914c, and 916c. In such embodiments, the processor may determine a plurality of rates of change of the distance between lines of the biometric feature over a period of time.

Figure 10A:
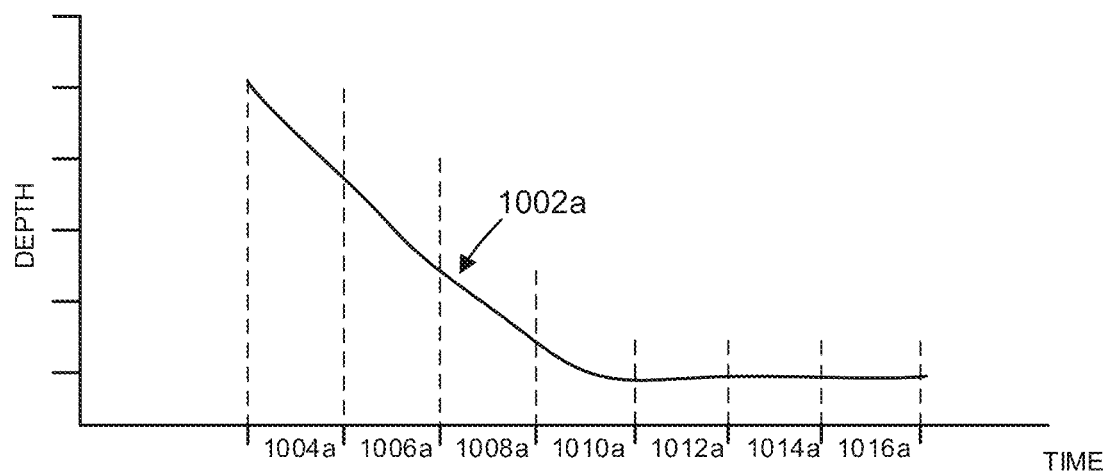
FIGS. 10A-10C illustrate plots of depth in an area of a biometric feature over time according to some embodiments.
Figure 10B:
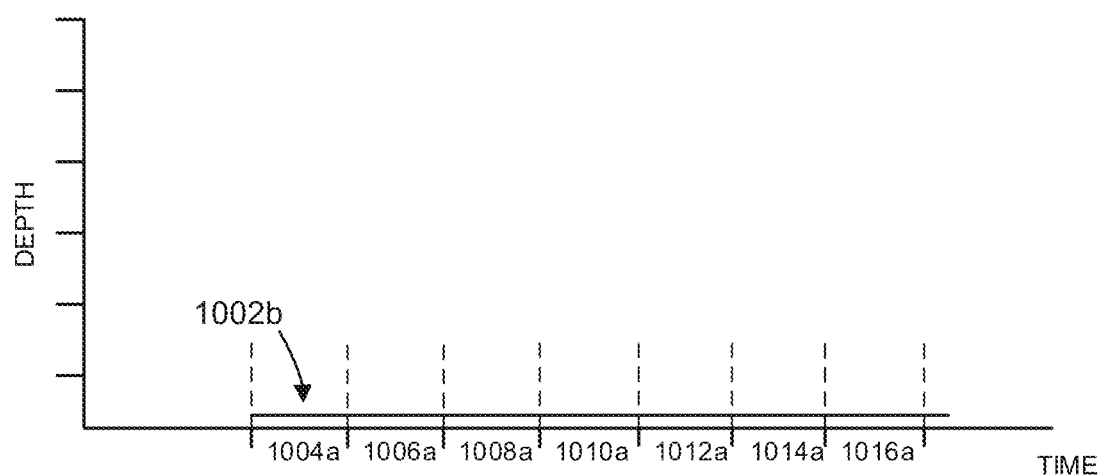
Figure 10C:
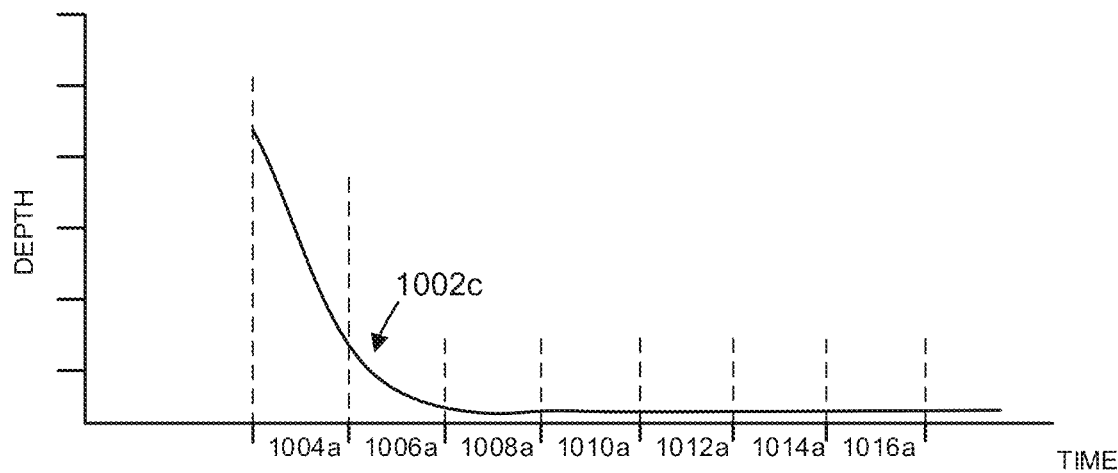

FIGS. 10A-10C illustrate plots of depth in an area of a biometric feature over time according to some embodiments. With reference to FIGS. 1-10C, a depth in an area of a biometric feature may be detected by a processor of a source device (e.g., the source device 202) based on a signal from a sensor of the source device (e.g., the scan unit 212).

In some embodiments, the processor may determine that a depth in an area of a biometric feature 1002a (FIG. 10A) decreases relatively smoothly over time, and then stabilizes at a relatively steady state. In some embodiments, the processor may determine that changes in the rate of stabilization of the depth in the area of the biometric feature over time may indicate that the biometric feature is live. In some embodiments, the processor may determine a rate of change of the depth in the area of the biometric feature 1002a over one or more segments of time, such as segments 1004a, 1006a, 1008a, 1010a, 1012a, 1014a, and 1016a. In such embodiments, the processor may determine a plurality of rates of change of the depth in the area of the biometric feature over a period of time.

In some embodiments, the processor may determine that a depth in an area of a biometric feature 1002b (FIG. 10B) exhibits little or no change over time. In some embodiments, the processor may determine that such lack of change of the depth in the area over time indicates that a biometric feature is not live. For example, a photograph of a fingerprint may exhibit a depth in an area of a biometric feature 1002b. In some embodiments, the processor may determine little or no rate(s) of change over one or more segments of time, such as segments 1004b, 1006b, 1008b, 1010b, 1012b, 1014b, and 1016b.

In some embodiments, the processor may determine that a depth in an area of a biometric feature 1002c (FIG. 10C) stabilizes in a manner inconsistent with a live biometric feature. For example, the processor may determine that the depth in the area of the biometric feature stabilizes too rapidly. In some embodiments, such a change in the rate of change of the depth in the area of the biometric feature may indicate the presence of, for example, a synthetic or manufactured finger, and thus, that the biometric feature is not live. In some embodiments, the processor may determine a rate of change over time of the depth in the area of the biometric feature 1002c. In some embodiments, the processor may determine a rate of change of the depth in the area of the biometric feature over one or more segments of time, such as segments 1004c, 1006c, 1008c, 1010c, 1012c, 1014c, and 1016c. In such embodiments, the processor may determine a plurality of rates of change of the depth in the area of the biometric feature over a period of time.

Figure 11A:
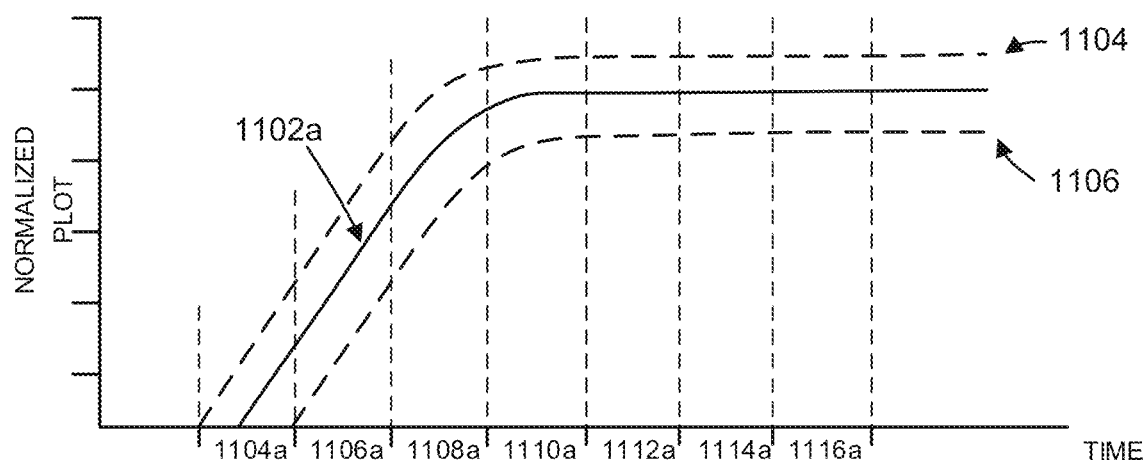
FIGS. 11A-11C illustrate liveness scores according to some embodiments.
Figure 11B:
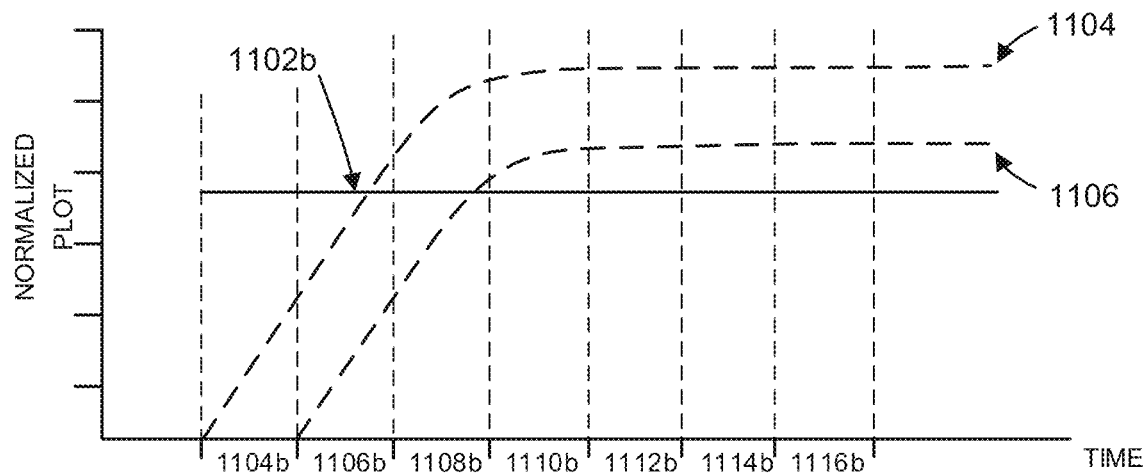
Figure 11C:
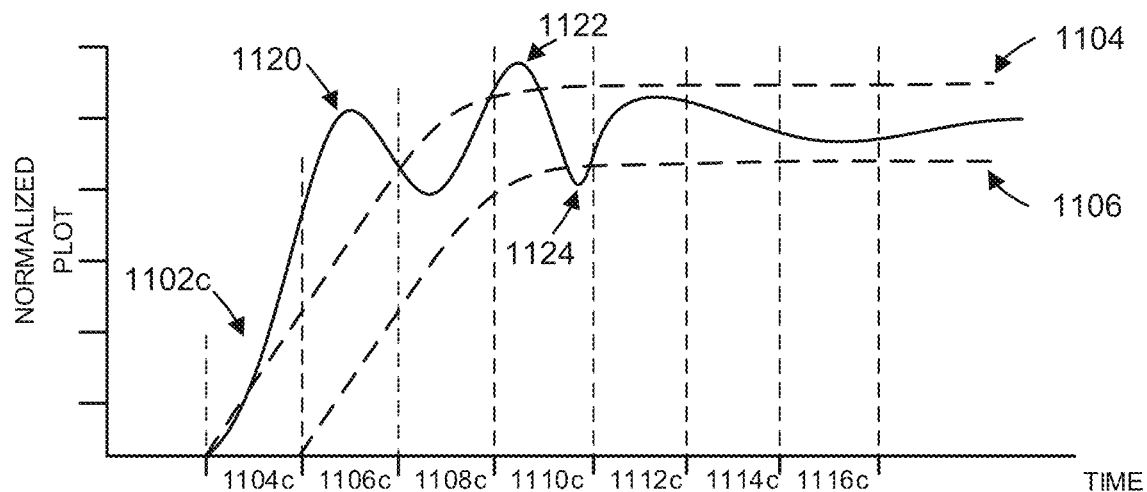

FIGS. 11A-11C illustrate liveness scores according to some embodiments. With reference to FIGS. 1-11C, a processor of a source device (e.g., the source device 202) may determine a liveness score based on one or more rates of change of one or more aspects of a biometric feature. In some embodiments, the processor of the source device may determine the one or more rates of change of the one or more aspects of the biometric feature based on signals from a sensor of the source device (e.g., the scan unit 212).

FIG. 11A illustrates a liveness score 1102a. In some embodiments, the processor of the source device may determine the liveness score over time. In some embodiments, the processor may determine the liveness score based on a combination of two or more rates of change of aspects of the biometric feature over time. In some embodiments, the processor may determine the liveness score based on a combination of two or more rates of change of a surface area of the biometric feature over time, rates of change of a location stability over time of the biometric feature, rates of change of a presence of the biometric feature over time, rates of change of a thickness of the line of the biometric feature over time, rates of change of a distance between lines of the biometric feature over time, and rates of change of a depth in an area of the biometric feature over time. In some embodiments, the liveness score may include a normalized plot or normalized curve over time. For example, the processor may determine the liveness score based on a combination of two or more of changes in the rate of change of the surface area over time 502a, changes in the rate of change of the location stability over time 602a, changes in the presence of the biometric feature over time 702a, changes in the rate of change of the line thickness of a biometric feature over time 802a, changes in the rate of change of the distance between two lines of the biometric feature over time 902a, and changes in the rate of change of the depth of an area of the biometric feature over time 1002a. In some embodiments, the processor may calculate a standard deviation from a mean of the changes in the one or more rates of change 502a, 602a, 702a, 802a, 902a, and 1002a.

In some embodiments, the processor may determine that the liveness score 1102a meets one or more liveness thresholds (e.g., liveness thresholds 1104, 1106). In some embodiments, the processor may determine that the calculated standard deviation from the mean of the changes in the one or more rates of change 502a, 602a, 702a, 802a, 902a, and 1002a meets the one or more liveness thresholds. In some embodiments, the processor may determine that the liveness score 1102a is within two or more liveness thresholds (e.g., the liveness thresholds 1104, 1106). In some embodiments, the one or more liveness thresholds 1104, 1106 may include a curve threshold or plot threshold that indicates an expected behavior or normal behavior of normalized changes over time of one or more aspects of a biometric feature. For example, the liveness score 1102a meets the liveness thresholds 1104 and 1106. In some embodiments, the processor may determine that the normalized curve is entirely within one liveness threshold. In some embodiments, the processor may determine that the normalized curve is entirely within two or more liveness thresholds. In some embodiments, in response to determining that the liveness score meets the one or more liveness thresholds 1104, 1106, the processor may determine that the biometric feature associated with the liveness score 1102a is a live biometric feature.

In various embodiments, when considered individually, the changes in the rate of change of one aspect of a biometric feature may not provide sufficiently clear data to distinguish in live biometric feature from a replay attack or a simulated (i.e., not live) biometric feature. By combining a plurality of detected changes in rates of change of two or more aspects of a biometric feature, a processor may more readily detect distinctions between aspects of a live biometric feature and aspects of a replay attack or simulated biometric feature. Further, normalization of the combination of detected rates of change may further magnify differences between a live biometric feature and a replay attack or simulated biometric feature.

FIG. 11B illustrates a liveness score 1102b that is consistent with or evidences a replay attack, such as presentation of a photo or other image of a biometric feature. In some embodiments, the processor may determine the liveness score 1102b based on a combination of two or more of changes in the rate of change of the surface area over time 502b, changes in the rate of change of the location stability over time 602b, changes in the presence of the biometric feature over time 702b, changes in the rate of change of the line thickness of a biometric feature over time 802b, changes in the rate of change of the distance between two lines of the biometric feature over time 902b, and changes in the rate of change of the depth of an area of the biometric feature over time 1002b. In some embodiments, the liveness score 1102b may include a normalized plot or normalized curve over time of the rates of change 502b-1002b. In some embodiments, the processor may determine that the liveness score 1102b does not meet the one or more liveness thresholds (e.g., liveness thresholds 1104, 1106). In some embodiments, the processor may determine that the liveness score 1102b is not within (i.e., does not meet) two or more liveness thresholds 1104, 1106). In some embodiments, in response to determining that the liveness score does not meet the one or more liveness thresholds 1104, 1106, the processor may determine that the biometric feature associated with the liveness score 1102b is not a live biometric feature.

FIG. 11C illustrates a liveness score 1102cs that is consistent with or evidences a simulation of a biometric feature, such as presentation of a "fake fingerprint" another simulation of an actual biometric feature. In some embodiments, the processor may determine the liveness score 1102c based on a combination of two or more of changes in the rate of change of the surface area over time 502c, changes in the rate of change of the location stability over time 602c, changes in the presence of the biometric feature over time 702c, changes in the rate of change of the line thickness of a biometric feature over time 802c, changes in the rate of change of the distance between two lines of the biometric feature over time 902c, and changes in the rate of change of the depth of an area of the biometric feature over time 1002c. In some embodiments, the processor may determine that the liveness score 1102c does not meet the one or more liveness thresholds (e.g., liveness thresholds 1104, 1106). For example, the processor may determine that one or more portions or areas 1120, 1122, 1124 of the liveness score 1102c does not meet one or more of the liveness thresholds 1104, 1106. In some embodiments, the processor may determine that the one or more portions or areas 1120, 1122, 1124 of the liveness score 1102c are not within (i e, do not meet) two or more liveness thresholds 1104, 1106). In some embodiments, in response to determining that the liveness score does not meet the one or more liveness thresholds 1104, 1106, the processor may determine that the biometric feature associated with the liveness score 1102c is not a live biometric feature.

Figure 12:
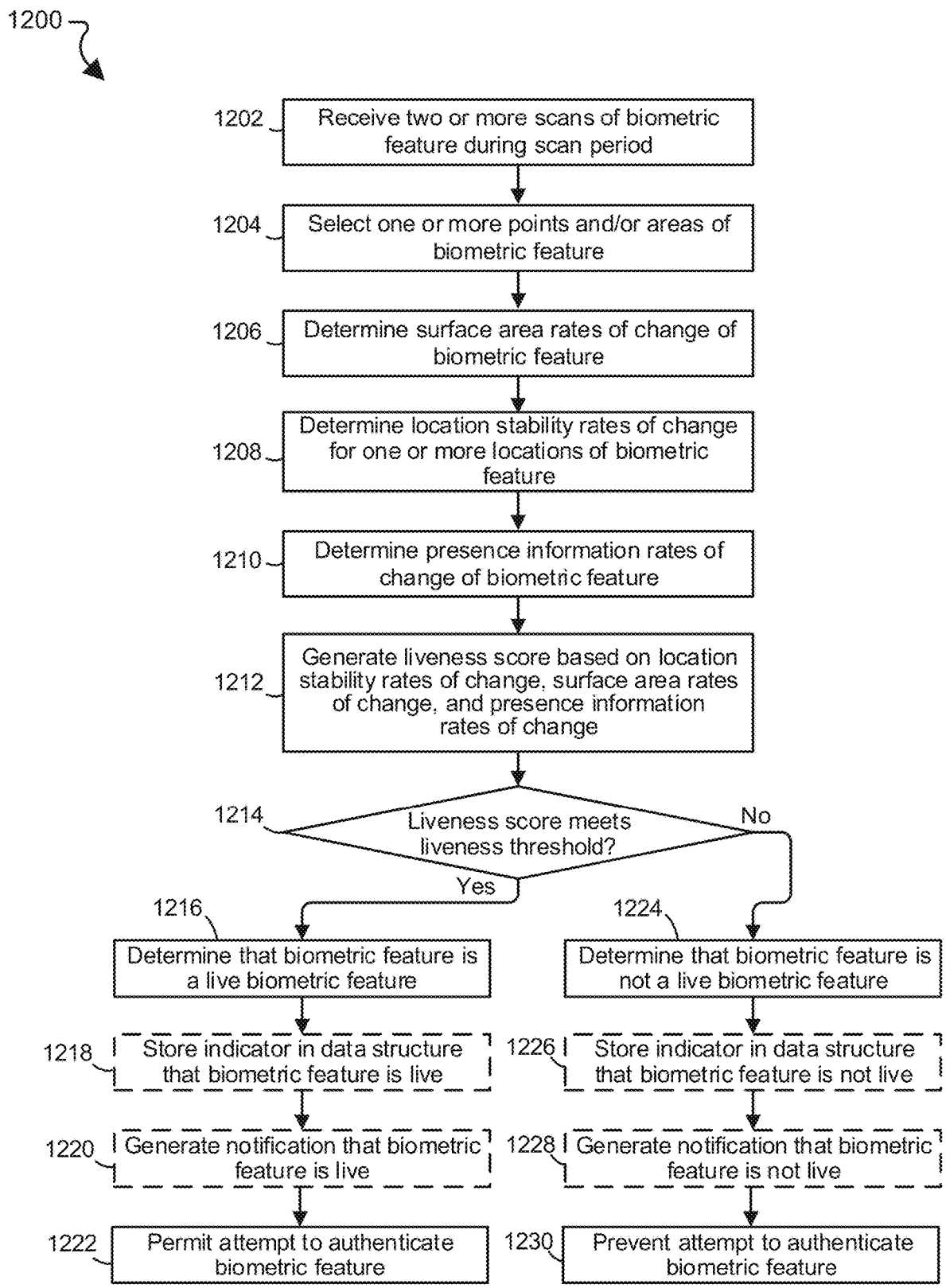
FIG. 12 is a process flow diagram illustrating a method of determining liveness of a biometric feature according to various embodiments.

FIG. 12 illustrates a method 1200 of determining liveness of a biometric feature according to various embodiments. With reference to FIGS. 1-12, the method 1200 may be implemented in a processor of a source device (e.g., the source device 202) or a or processor of a verification device (e.g., the verification device 104) based on a signal from a sensor of the source device (e.g., the scan unit 212).

In block 1202, the processor may receive two or more scans of a biometric feature during a scan period. For example, the processor may receive two or more of the scans 400a-400g.

In block 1204, the processor may select one or more points and/or areas of the biometric feature. For example, the processor may select one or more of the points 406a and/or one or more of the areas 408a, 410a.

In block 1206, the processor may determine rates of change of a surface area of the biometric feature. For example, the processor may determine rates of change of the surface area 404a-404g of the biometric feature (e.g., the rates of change of the surface area 502a, 502b, 502c). In some embodiments, the processor may determine the rates of change of the surface area over one or more segments of a time period (e.g., the segments 504-516)

In block 1208, the processor may determine rates of change of location stability for one or more locations (e.g., point(s) or area(s)) of the biometric feature. For example, the processor may determine rates of change of a location stability for the one or more of the areas 406a-406g, points 408a-408g, and/or 410a-410g (e.g., the rates of change of the location stability 602a, 602b, 602c). In some embodiments, the processor may determine the rates of change of location stability over one or more segments of a time period (e.g., the segments 604-616)

In block 1210, the processor may determine rates of change of presence information of the biometric feature. In some embodiments, the processor may determine whether there is a "ramp up" time over which one or more aspects of the biometric feature change. In some embodiments, the processor may determine a time period during which the processor detects the presence of the biometric feature. In some embodiments, the processor may determine the rates of change of presence information over one or more segments of a time period (e.g., the segments 704-716)

In block 1212, the processor may generate a liveness score based the location stability rates of change, the surface area rates of change, and the presence information rates of change. In some embodiments, the processor may generate the liveness score based on a combination of the location stability rates of change, the surface area rates of change, and the presence information rates of change. In some embodiments, the liveness score may include a normalized plot or normalized curve of combination of the location stability rates of change, the surface area rates of change, and the presence information rates of change. In some embodiments, the liveness score may include a normalized plot similar to those illustrated in FIGS. 11A-11C.

In determination block 1214, the processor may determine whether the liveness score meets a liveness threshold. In some embodiments, the processor may determine the liveness threshold based on a standard deviation of the normalized plot or normalized curve of combination of the location stability rates of change, the surface area rates of change, and the presence information rates of change.

In response to determining that the liveness score meets the threshold (i.e., determination block 1214="Yes"), the processor may determine that the biometric feature is a live biometric feature in block 1216.

In optional block 1218, the processor may store an indicator in a data structure (e.g., in the memory 210 of the source device 210, or in the storage 308 of the processing node 300) that the biometric feature is live.

In optional block 1220, the processor may generate a notification that the biometric feature is live. In some embodiments, the processor may present the notification at the source device 200 or the processing node 300.

In block 1222, the processor may permit an attempt to authenticate the biometric feature based on the determination that the biometric feature is a live biometric feature. For example, the processor may proceed to process the biometric feature to identify features of the biometric feature and to verify that the presented biometric feature is associated with a person's identity.

In response to determining that the liveness score does not meet the threshold (i.e., determination block 1214="No"), the processor may determine that the biometric feature is not a live biometric feature in block 1224.

In optional block 1226, the processor may store an indicator in a data structure (e.g., in the memory 210 of the source device 210, or in the storage 308 of the processing node 300) that the biometric feature is not live.

In optional block 1228, the processor may generate a notification that the biometric feature is not live. In some embodiments, the processor may present the notification at the source device 200 or the processing node 300.

In block 1230, the processor may prevent or block an attempt to authenticate the biometric feature in response to determining that the biometric feature is not a live biometric feature. For example, the processor may prevent or block further processing of the biometric feature to identify features of the biometric feature to verify that the presented biometric feature is associated with a person's identity.

Figure 13:
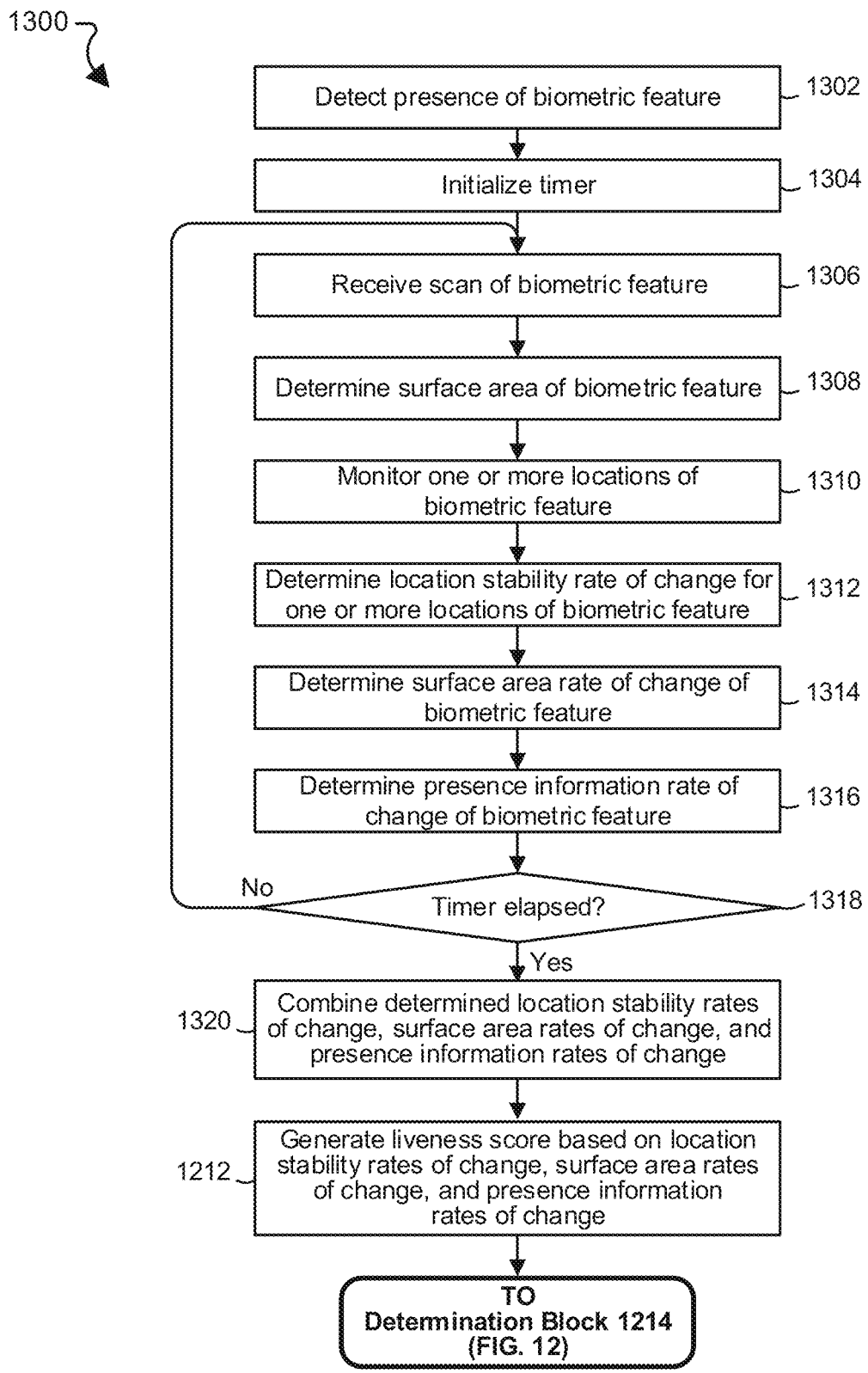
FIG. 13 is a process flow diagram illustrating a method of determining liveness of a biometric feature according to various embodiments.

FIG. 13 illustrates a method 1300 of determining liveness of a biometric feature according to various embodiments. With reference to FIGS. 1-13, the method 1300 may be implemented in a processor of a source device (e.g., the source device 202) or a or processor of a verification device (e.g., the verification device 104) based on a signal from a sensor of the source device (e.g., the scan unit 212).

In block 1302, the processor may detect a presence of a biometric feature. For example, the processor may detect contact on, or coverage of a portion of, a sensor of the source device 210.

In block 1304, the processor may initialize a timer. In some embodiments, the timer may measure a period of time during which the processor may receive one or more scans of the detected biometric feature. In some embodiments, during the period of time, the processor may perform one or more operations iteratively, as further described below.

In block 1306, the processor may receive a scan of the biometric feature (e.g., from the scan unit 212).

In block 1308, the processor may determine a surface area of the biometric feature. For example, the processor may determine one of the surface areas 404a-404g.

In block 1310, the processor may monitor one or more locations of the biometric feature. In some embodiments, the one or more locations may include one or more points and/or one or more areas of the biometric feature (e.g., the points 406a-406g and/or the area(s) 408a-408g, 410a-410g.) In some embodiments, the processor may select the one or more locations of the biometric feature, and then in later iterations the processor may monitor the selected locations of the biometric feature.

In block 1312, the processor may determine a surface area rate of change of the biometric feature. In some embodiments, the processor may determine a rate of surface area change over the time period measured by the timer (e.g., of operation 1304). In some embodiments, the processor may determine a rate of surface area change over a segment of the time period (e.g., one of the segments 504-516).

In block 1314, the processor may determine a location stability rate of change for the one or more locations of the biometric feature. In some embodiments, the processor may determine a location stability rate of change over the time period measured by the timer. In some embodiments, the processor may determine a location stability rate of change over a segment of the time period (e.g., one of the segments 604-616).

In block 1316, the processor may determine a rate of change of presence information of the biometric feature. In some embodiments, the processor may determine a rate of change of presence information over the time period measured by the timer. In some embodiments, the processor may determine a rate of change of presence information over a segment of the time period (e.g., one of the segments 704-716).

In determination block 1318, the processor may determine whether the timer has elapsed. In response to determining that the timer has not elapsed (i.e., determination block 1318="No"), the processor may repeat the operations of blocks 1306-1318.

In response to determining that the timer has elapsed (i.e., determination block 1318="Yes"), the processor may combine the determined location stability rate(s) of change, the surface area rate(s) of change, and the presence information rate(s) of change in block 1320. For example, the processor may apply an integral calculus approach to combine the determined location stability rate(s) of change, the surface area rate(s) of change, and the presence information rate(s) of change.

The processor may then perform the operations determination block 1214 (FIG. 12) as described.

Figure 14:
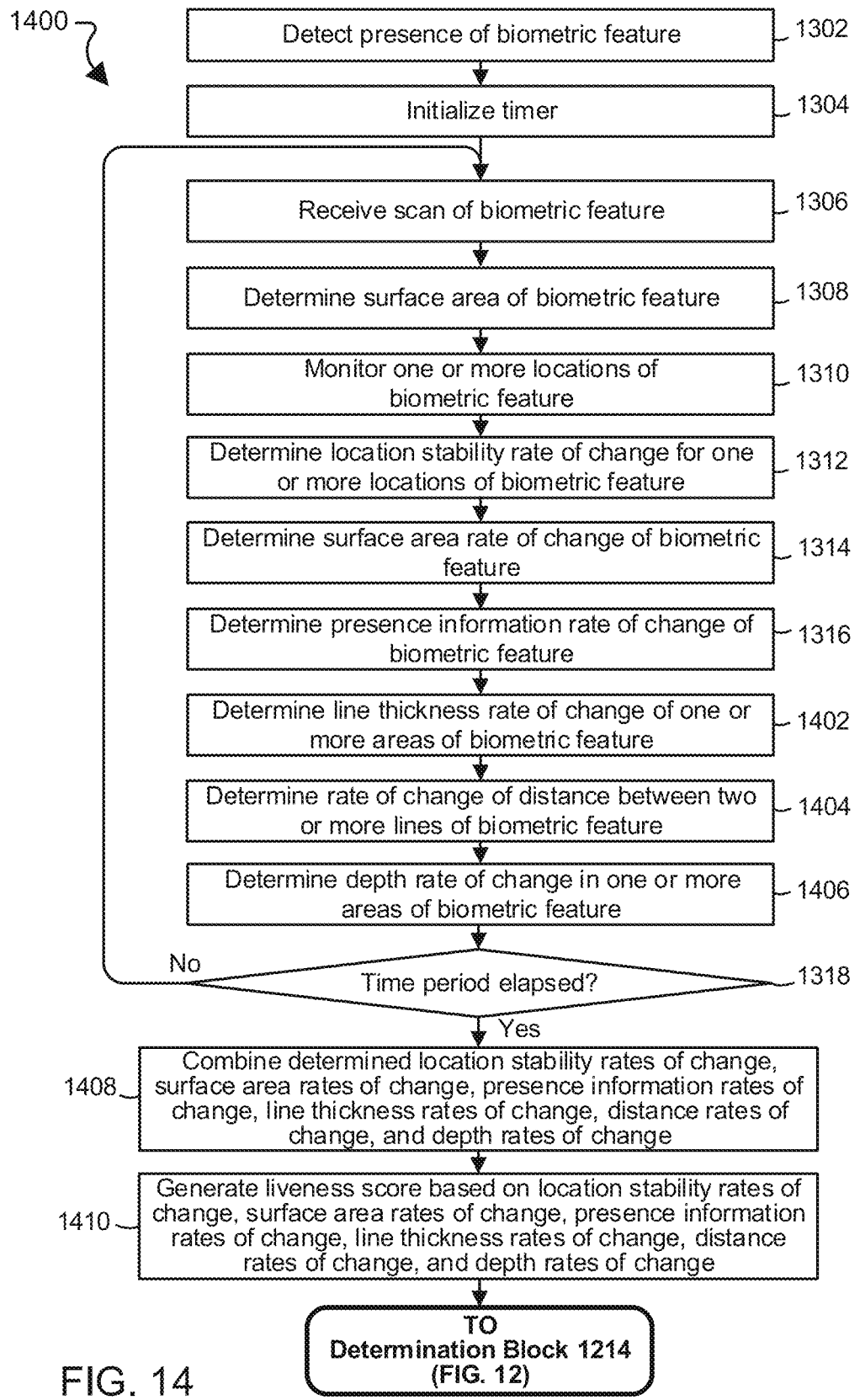
FIG. 14 is a process flow diagram illustrating a method of determining liveness of a biometric feature according to various embodiments.

FIG. 14 illustrates a method 1400 of determining liveness of a biometric feature according to various embodiments. With reference to FIGS. 1-14, the method 1400 may be implemented in a processor of a source device (e.g., the source device 202) or a or processor of a verification device (e.g., the verification device 104) based on a signal from a sensor of the source device (e.g., the scan unit 212). In blocks 1212 and blocks 1302-1318, the processor may perform operations of like-numbered blocks of the methods 1200 and 1300 as described.

In block 1402, the processor may determine a line thickness rate of change of one or more areas of the biometric feature. In some embodiments, the processor may determine a line thickness of change of the one or more areas of the biometric feature over the time period measured by the timer (e.g., 802). In some embodiments, the processor may determine a line thickness rate of change of the one or more areas of the biometric feature over a segment of the time period (e.g., one of the segments 804-816).

In block 1404, the processor may determine a rate of change of distance between two or more lines of the biometric feature. In some embodiments, the processor may determine a rate of change of distance between two or more lines of the biometric feature over the time period measured by the timer (e.g., 902). In some embodiments, the processor may determine a rate of change of distance between two or more lines of the biometric feature over a segment of the time period (e.g., one of the segments 904-916).

In block 1406, the processor may determine a rate of change of depth in one or more areas of the biometric feature. In some embodiments, the processor may determine a change of thickness in the one or more areas of the biometric feature over the time period measured by the timer (e.g., 1002). In some embodiments, the processor may determine a thickness rate of change of the one or more areas of the biometric feature over a segment of the time period (e.g., one of the segments 1004-1016).

In response to determining that the timer has elapsed (i.e., determination block 1318="Yes"), the processor may combine the determined location stability rate(s) of change, the surface area rate(s) of change, the presence information rate(s) of change, the thickness rate(s) of change, the rate(s) of change of distance between one or more lines of the biometric feature, and the depth rate(s) of change in block 1408. For example, the processor may apply an integral calculus approach to combine the determined location stability rate(s) of change, the surface area rate(s) of change, the presence information rate(s) of change, the thickness rate(s) of change, the rate(s) of change of distance between one or more lines of the biometric feature, and the depth rate(s) of change.

In block 1410, he processor may generate a liveness score based on the combination of the determined location stability rate(s) of change, the surface area rate(s) of change, the presence information rate(s) of change, the thickness rate(s) of change, the rate(s) of change of distance between one or more lines of the biometric feature, and the depth rate(s) of change. In some embodiments, the liveness score may include a normalized plot or normalized curve of combination of the location stability rates of change, the surface area rates of change, and the presence information rates of change. In some embodiments, the liveness score may include a normalized plot similar to those illustrated in FIGS. 11A-11C.

The processor may then perform the operations determination block 1214 (FIG. 12) as described.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 1200, 1300, and 1400 may be substituted for or combined with one or more operations of the methods 1200, 1300, and 1400, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include read-only memory (ROM), random-access memory (RAM), erasable electrically programmable ROM (EEPROM), FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. The non-transitory computer-readable or processor-readable storage medium may also be distributed over network-coupled computer systems so that the non-transitory computer-readable or processor-readable storage medium is stored and executed in a distributed fashion. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a computing device of determining liveness of a biometric feature, comprising:

receiving two or more scans of a biometric feature from a sensor of a source device wherein the biometric feature is in contact with the sensor of the source device;

determining surface area rates of change of a surface area of the biometric feature in contact with the sensor of the source device;

determining location stability rates of changes for one or more locations of the biometric feature;

determining presence information rates of change of the biometric feature;

determining a line thickness rate of change of one or more areas of the biometric feature;

generating a liveness score based on the determined location stability rates of change, the surface area rates of change, the presence information rates of change of the biometric feature, and the line thickness rate of change of one or more areas of the biometric feature;

determining whether the generated liveness score meets a liveness threshold; and determining that the biometric feature is a live biometric feature in response to determining that the generated liveness score meets the liveness threshold.

2. The method of claim 1, further comprising:

determining a rate of change of distance between two or more lines of the biometric feature;

wherein generating a liveness score based on the determined location stability rates of change, the surface area rates of change, and the presence information rates of change of the biometric feature comprises:

generating a liveness score based on the determined location stability rates of change, the surface area rates of change, and the presence information rates of change of the biometric feature, and rate of change of distance between two or more lines of the biometric feature.

3. The method of claim 1, further comprising:

determining a rate of change of depth change in one or more areas of the biometric feature;

wherein generating a liveness score based on the determined location stability value, the surface area change value, and the presence information value of the biometric feature comprises:

generating a liveness score based on the determined location stability value, the surface area change value, the presence information value, and the rate of change of depth in one or more areas of the biometric feature.

4. The method of claim 1, wherein generating a liveness score based on the determined location stability value, the surface area change value, and the presence information value of the biometric feature comprises:

generating the liveness score based on a plurality of the determined location stability rates of change, the surface area rates of change, and the presence information rates of change of the biometric feature determined during a scan time period.

5. The method of claim 1, further comprising:

determining that the biometric feature is not a live biometric feature in response to determining that the generated liveness score does not meet the liveness threshold.

6. The method of claim 1, wherein determining whether the generated liveness score meets a liveness threshold comprises:

determining whether the generated liveness score is within two liveness thresholds.

7. The method of claim 1, wherein generating a liveness score based on the determined location stability rates of change, the surface area rates of change, and the presence information rates of change of the biometric feature comprises:

generating a normalized curve based on the determined location stability rates of change, the surface area rates of change, and the presence information rates of change of the biometric feature.

8. The method of claim 7, wherein determining whether the generated liveness score meets a liveness threshold comprises:

determining whether the generated normalized curve meets the liveness threshold.

9. The method of claim 7, wherein determining that the biometric feature is not a live biometric feature in response to determining that the generated liveness score does not meet the liveness threshold comprises:

determining that the biometric feature is not a live biometric feature in response to determining that one or more portions of the normalized curve does not meet the liveness threshold.

10. The method of claim 1, further comprising:

permitting an attempt to authenticate the biometric feature based on the determination that the biometric feature is a live biometric feature.

11. A computing device, comprising:

a memory; and a processor coupled to the memory and configured with processor-executable instructions to perform operations comprising:

receiving two or more scans of a biometric feature from a sensor of a source device, wherein the biometric feature is in contact with the sensor of the source device;

determining surface area rates of change of a surface area of the biometric feature in contact with the sensor of the source device;

determining location stability rates of changes for one or more locations of the biometric feature;

determining presence information rates of change of the biometric feature;

determining a line thickness rate of change of one or more areas of the biometric feature;

generating a liveness score based on the determined location stability rates of change, the surface area rates of change, the presence information rates of change of the biometric feature, and the line thickness rate of change of one or more areas of the biometric feature;

determining whether the generated liveness score meets a liveness threshold; and determining that the biometric feature is a live biometric feature in response to determining that the generated liveness score meets the liveness threshold.

12. The computing device of claim 11, wherein the processor is configured with processor-executable instructions to perform operations further comprising:

determining a rate of change of distance between two or more lines of the biometric feature;

wherein generating a liveness score based on the determined location stability rates of change, the surface area rates of change, and the presence information rates of change of the biometric feature comprises:

generating a liveness score based on the determined location stability rates of change, the surface area rates of change, and the presence information rates of change of the biometric feature, and rate of change of distance between two or more lines of the biometric feature.

13. The computing device of claim 11, wherein the processor is configured with processor-executable instructions to perform operations further comprising:

determining a rate of change of depth change in one or more areas of the biometric feature;

wherein generating a liveness score based on the determined location stability value, the surface area change value, and the presence information value of the biometric feature comprises:

generating a liveness score based on the determined location stability value, the surface area change value, the presence information value, and the rate of change of depth in one or more areas of the biometric feature.

14. The computing device of claim 11, wherein the processor is configured with processor-executable instructions to perform operations such that generating a liveness score based on the determined location stability value, the surface area change value, and the presence information value of the biometric feature comprises:

generating the liveness score based on a plurality of the determined location stability rates of change, the surface area rates of change, and the presence information rates of change of the biometric feature determined during a scan time period.

15. The computing device of claim 11, wherein the processor is configured with processor-executable instructions to perform operations further comprising:

determining that the biometric feature is not a live biometric feature in response to determining that the generated liveness score does not meet the liveness threshold.

16. The computing device of claim 11, wherein the processor is configured with processor-executable instructions to perform operations such that generating a liveness score based on the determined location stability rates of change, the surface area rates of change, and the presence information rates of change of the biometric feature comprises:

generating a normalized curve based on the determined location stability rates of change, the surface area rates of change, and the presence information rates of change of the biometric feature.

17. The computing device of claim 16, wherein the processor is configured with processor-executable instructions to perform operations such that determining whether the generated liveness score meets a liveness threshold comprises:

determining whether the generated normalized curve meets the liveness threshold.

18. A non-transitory processor-readable storage medium having stored thereon processor-executable software instructions configured to cause a processor of a computing device to perform operations comprising:

receiving two or more scans of a biometric feature from a sensor of a source device, wherein the biometric feature is in contact with the sensor of the source device;

determining surface area rates of change of a surface area of the biometric feature in contact with the sensor of the source device;

determining location stability rates of changes for one or more locations of the biometric feature;

determining presence information rates of change of the biometric feature;

determining a line thickness rate of change of one or more areas of the biometric feature;

generating a liveness score based on the determined location stability rates of change, the surface area rates of change, the presence information rates of change of the biometric feature, and the line thickness rate of change of one or more areas of the biometric feature;

determining whether the generated liveness score meets a liveness threshold; and determining that the biometric feature is a live biometric feature in response to determining that the generated liveness score meets the liveness threshold.

\* \* \* \* \*